(12) United States Patent
Belghoul et al.

(10) Patent No.: US 10,743,147 B2
(45) Date of Patent: Aug. 11, 2020

(54) EXPANDED IMPLEMENTATION OF ENHANCED BROADCAST MULTICAST SERVICES FOR BROADCAST MULTICAST CONTENT SELECTION AND SERVICE

(71) Applicant: Apple Inc., Cupertino, CA (US)

(72) Inventors: Farouk Belghoul, Campbell, CA (US); Christian W. Mucke, Cupertino, CA (US); Rafael L. Rivera-Barreto, Santa Clara, CA (US); Ayman F. Naguib, Cupertino, CA (US); Rohan C. Malthankar, San Jose, CA (US); Ben-Heng Juang, Milpitas, CA (US); Kushal M. Chawda, Campbell, CA (US); Sumit Saxena, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 16/145,323

(22) Filed: Sep. 28, 2018

(65) Prior Publication Data
US 2019/0132708 A1    May 2, 2019

Related U.S. Application Data

(60) Provisional application No. 62/578,961, filed on Oct. 30, 2017, provisional application No. 62/620,984, filed on Jan. 23, 2018.

(51) Int. Cl.
*H04W 4/06* (2009.01)
*H04W 4/029* (2018.01)
(Continued)

(52) U.S. Cl.
CPC .............. *H04W 4/06* (2013.01); *G06N 20/00* (2019.01); *H04L 12/189* (2013.01); *H04L 12/1845* (2013.01); *H04W 4/029* (2018.02)

(58) Field of Classification Search
CPC ..... H04W 4/06; H04W 4/029; H04W 12/189; H04W 12/1845; G06N 20/00
See application file for complete search history.

(56) References Cited

U.S. PATENT DOCUMENTS

| | | | |
|---|---|---|---|
| 2005/0074024 A1* | 4/2005 | Kim ................... | H04L 12/18 370/432 |
| 2010/0157872 A1* | 6/2010 | Hyun .................. | H04L 12/1886 370/312 |

(Continued)

FOREIGN PATENT DOCUMENTS

| | | | |
|---|---|---|---|
| EP | 3 188 086 A1 | 5/2017 | |
| EP | 3 185 643 A1 | 6/2017 | |
| EP | 3188086 A1 * | 7/2017 | ........... G06N 3/0454 |

OTHER PUBLICATIONS

International Search Report, Application No. PCT/US2018/053944, dated Oct. 2, 2018, three pages.

*Primary Examiner* — Curtis A Alia
(74) *Attorney, Agent, or Firm* — Kowert, Hood, Munyon, Rankin & Goetzel, P.C.

(57) ABSTRACT

A network controller, a user equipment (UE) device, and associated methods for conducting intelligent enhanced multimedia broadcast multicast services (eMBMS). A network controller receives user preference information and location information from a plurality of UEs. The network controller selects one or more data packages to transmit using eMBMS in one or more broadcast regions based on the user preference information and the location information. The one or more data packages may comprise an updated machine learning model in a distributed learning application. The network controller provides an indication to a remote device to broadcast the one or more data packages in the respective one or more broadcast regions using eMBMS.

20 Claims, 21 Drawing Sheets

(51) Int. Cl.
*G06N 20/00* (2019.01)
*H04L 12/18* (2006.01)

(56) References Cited

U.S. PATENT DOCUMENTS

| | | | |
|---|---|---|---|
| 2012/0170485 A1* | 7/2012 | Maeda | H04B 7/2643 370/252 |
| 2013/0107790 A1* | 5/2013 | Lee | H04W 4/06 370/312 |
| 2016/0205662 A1 | 7/2016 | Cormier | |
| 2017/0013421 A1 | 1/2017 | Kodaypak | |
| 2017/0041748 A1* | 2/2017 | Kodaypak | H04L 12/1845 |
| 2017/0135068 A1 | 5/2017 | Kodaypak | |
| 2017/0164161 A1 | 6/2017 | Gupta | |

* cited by examiner

|  | (CIFAR 10) 85% Accuracy | (CIFAR 10) 80% Accuracy |
| --- | --- | --- |
| Num Clients: m | 100 | 100 |
| Local Minibatch Size: B | 50 | 50 |
| Local Epochs: E | 5 | 5 |
| Rounds of Communication = R | 2000 | 280 |
| Number of Client Uploads = R | 2000 | 280 |
| Number of Downloads = m*R | 200000 | 28000 |
| Size of Model (Mb) | 4 | 4 |
| Size of UL Per Round per Client (After Large Compression) (Mb) | 0.17 | 0.17 |
| Total Size of DL (Total) (Mb) | 800000 | 112000 |
| Total Size of DL (Broadcast) | 8000 | 1120 |
| Total Size of UL (Mb) | 8000 | 1120 |
| Size of DL (Total) (Mb) After Compression | 1052.6 | 147.4 |
| Size of UL (Per Client) (Mb) After Large Compression | 343.3 | 48.1 |
| eMBMS DL Savings Factor (X) = m | 100 | 100 |
| UL Compression Factor (MED) | 7.6 | 7.6 |
| UL Compression Factor (Large) | 23.3 | 23.3 |
| Size of DL (Total) (Mb) After Compression | 1052.6 | 147.4 |
| Size of UL (All Rounds) (Mb) After Large Compression | 343.3 | 48.1 |

FIG. 16

EXPANDED IMPLEMENTATION OF ENHANCED BROADCAST MULTICAST SERVICES FOR BROADCAST MULTICAST CONTENT SELECTION AND SERVICE

PRIORITY INFORMATION

This application claims priority to U.S. provisional patent application Ser. No. 62/578,961, entitled "Intelligent Broadcast and/or Multicast Content Selection and Service", filed Oct. 30, 2017, and U.S. provisional patent application Ser. No. 62/620,984, entitled "Expanded Implementation of Enhanced Broadcast Multicast Services Broadcast and/or Multicast Content Selection and Service," filed Jan. 23, 2018, which are hereby incorporated by reference in their entirety as though fully and completely set forth herein.

FIELD

The present disclosure relates to wireless communication, and more particularly to multicast communication in wireless systems.

DESCRIPTION OF THE RELATED ART

Multicast communication refers to communication of information from a sender to a group (e.g., a "multicast group") of destinations simultaneously. While many wireless systems include some mechanisms for multicast communication, such mechanisms are sometimes subject to limitations with respect to their reliability, efficiency, and/or other attributes. Accordingly, improvements in this domain would be desirable.

SUMMARY

This document describes, inter alia, methods for wireless devices and network infrastructure related to the performance of broadcast and/or multicast communication, and describes wireless devices and network infrastructure configured to implement the described methods.

In some embodiments, a network controller is configured to direct broadcast and/or multicast communication. Broadcast and/or multicast communications may generally refer herein to any combination of broadcast communications and/or multicast communications, such as multimedia broadcast multicast services (MBMS), or enhanced MBMS (eMBMS), among other possibilities. The network controller may receive user preference information from a plurality of user equipment devices (UEs), the user preference information indicating a preference of respective UEs to receive one or more data packages through a broadcast and/or multicast service. The network controller may further receive location information from at least a subset of the plurality of UEs.

In some embodiments, the network controller may select one or more broadcast regions within which to perform broadcast and/or multicast services based at least in part on the user preference information and the location information. For each selected broadcast region, the network controller may select one or more data packages to broadcast and/or multicast based at least in part on the user preference information and the location information. The network controller may then provide an indication to a remote device to broadcast and/or multicast the one or more data packages in the respective one or more broadcast regions.

In some embodiments, a user equipment device (UE) is configured to perform broadcast and/or multicast communication. The UE may be configured to receive a list of data packages that are available for broadcast and/or multicast services, and receive user input specifying user preference for receiving one or more of the data packages through broadcast and/or multicast.

In some embodiments, the UE may transmit the user preference to a remote server; and at least in part in response to transmitting the user preference to the remote server, the UE may receive at least one of the one or more data packages through broadcast and/or multicast.

In some embodiments, eMBMS may be used for distributed machine learning. In these embodiments, an updated machine learning model may be distributed to a plurality of participating UEs using eMBMS. The participating UEs may each training operations using local data to obtain updated parameters of the machine learning model. The participating UEs may upload the updated parameters to the network controller, which may use the updated parameters to obtain a further updated machine learning model.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIG. 16 is a table illustrating computational requirements associated with collaborative deep learning, according to some embodiments;

Figure 1:
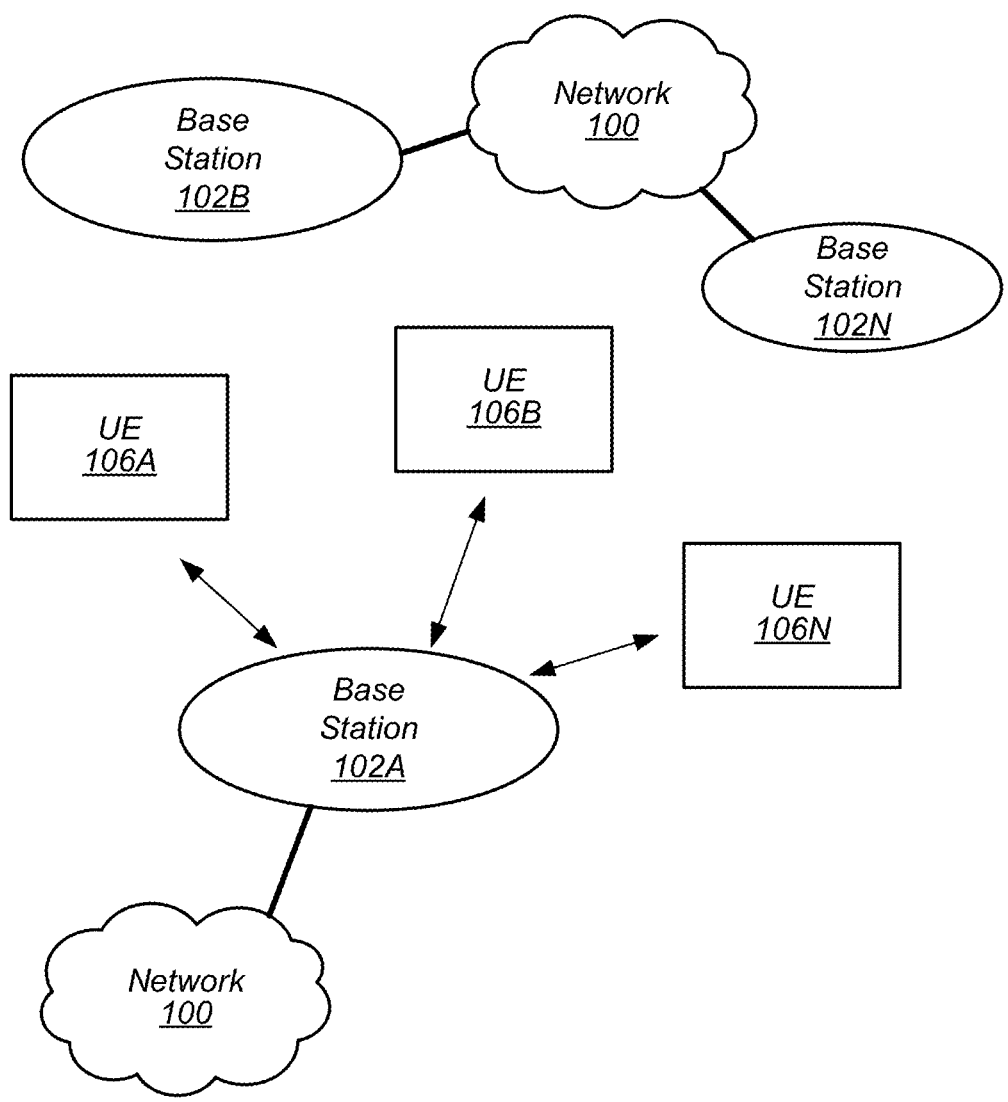
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Incorporation by Reference

The following references are hereby incorporated by reference in their entirety as though fully and completely set forth herein:
1. McMahan, H. Brendan, Eider Moore, Daniel Ramage, Seth Hampson and Blaise Agüera y Arcas. "Communication-Efficient Learning of Deep Networks from Decentralized Data." AISTATS (2017).
2. K. Bonawitz, V. Ivanov, B. Kreuter, A. Marcedone, H. B. McMahan, S. Patel, D. Ramage, A. Segal, K. Seth, "Practical Secure Aggregation for Federated Learning on User-Held Data", *NIPS Workshop on Private Multi-Party Machine Learning* (2016)

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station (such as an evolved node B, or eNB, for example) installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
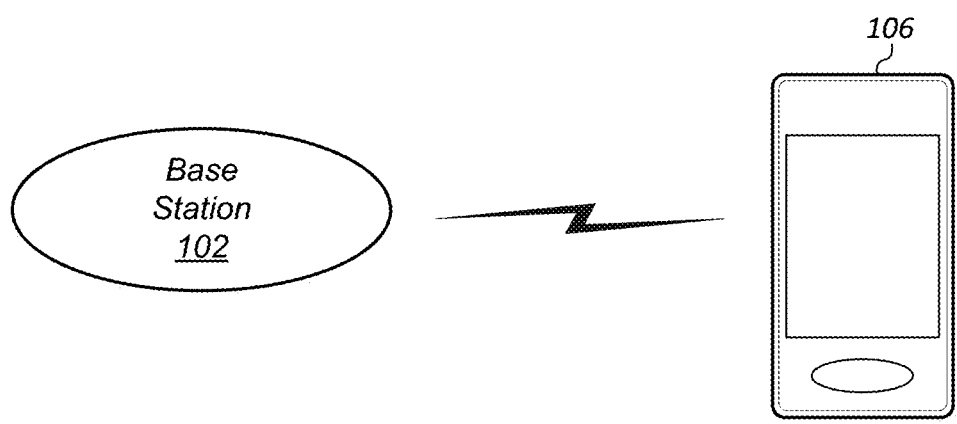
FIG. 2 illustrates an exemplary user equipment (UE) in communication with an exemplary base station, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

In various embodiments, the base station 102A may be configured to communicate with separate UEs 106A-106N through dedicated UE-specific communication channels, or 'unicast' communications. Additionally or alternatively, the base station 102A may be configured to communicate with multiple ones of the UEs 106A-106N through a common broadcast and/or multicast communication channel, wherein a single broadcast and/or multicast transmission is received by each of a plurality of UEs.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
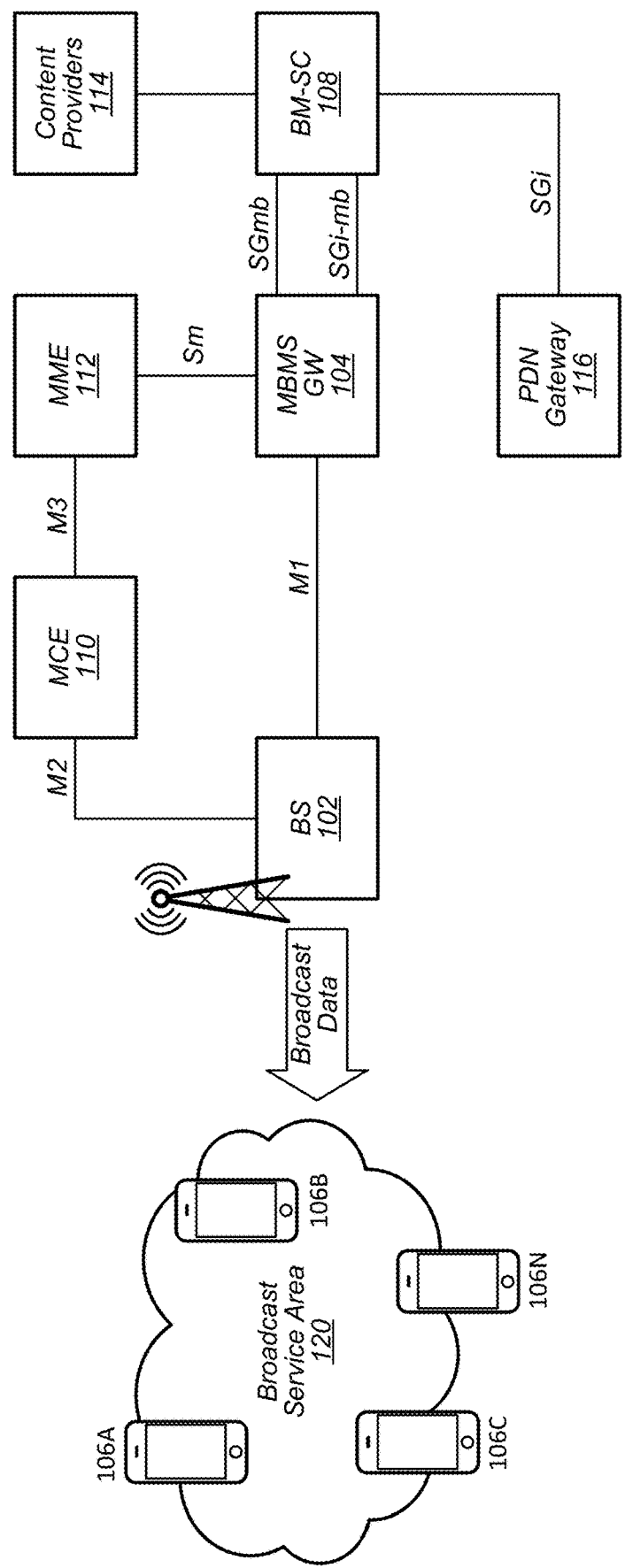
FIG. 3 illustrates an example simplified wireless communication system configured to conduct intelligent enhanced multimedia broadcast multicast services (eMBMS), according to some embodiments.

FIG. 3—Wireless eMBMS Communication System

FIG. 3 illustrates a simplified wireless communication system configure to perform intelligent enhanced multimedia broadcast multicast services (eMBMS) services, according to some embodiments. In FIG. 3, the BS 102, MME 112, content provider 114, and PDN gateway 116 represent network infrastructure that is standard for typical wireless communication protocols. In contrast, the MCE 110, MBMS GW 104, and BM-SC 108 represent additional components that are introduced for implementing eMBMS.

As illustrated, a plurality of UEs 106A-106N may be in a broadcast service area 120 of base station 102, which may be an evolved Node B (eNB) in some embodiments. The BS 102 may be communicatively coupled to a multimedia broadcast multicast multimedia services gateway (MBMS GW) 104 through an M1 interface. The MBMS GW 104 may be connected to multiple BSs 102A-102N (not shown) for distribution of data for eMBMS broadcasting. The MBMS GW 104 may broadcast all data packets intended for eMBMS broadcasting to the BSs within a service area, and the MBMS GW may additionally direct session management (e.g., through Session Start and Session Stop directions). In some embodiments, the M1 interface makes use of an internet protocol (IP) multicast protocol for the delivery of data packets to BSs. The BS may additionally be communicatively coupled to a multicast coordination entity (MCE) 110 through an M2 interface. The MCE 110 may be responsible for allocation of time and frequency resources for eMBMS transmissions. The MCE 110 may perform the scheduling on the radio interface, and the MCE 110 may be a logical node which may be integrated as part of the BS, or may be a separate device. The M2 interface may be used by the MCE 110 to provide the BS 102 with radio configuration information. The MCE 110 may allocate radio resources used by eNBs in the same broadcast area, and may configure subframes for eMBMS control and data broadcast. The MCE 100 may further ensure that the L2/L3 layers in eNBs are well configured for eMBMS operation. The MCE 110 may be communicatively coupled to a mobile management entity (MME) 112 through an M3 interface. The M3 interface may support eMBMS session control signaling (e.g., for session initiation and termination).

As illustrated, the MBMS GW 104 may be communicatively coupled to a broadcast multicast service center (BM-SC) 108 through each of a SGmb and a SGi-mb interface. The BM-SC 108 may serve as an entry point for content providers and/or other sources of eMBMS data packets, which are external to the network. For example, the BM-SC 108 may serve to authenticate terminals requesting activation of an eMBMS service. The BM-SC 108 may be further configured to implement intelligent broadcast and/or multicast services, according to some embodiments. The SGmb interface may support signaling procedures between the BM-SC 108 and the MBMS GW 104, including eMBMS bearer signaling for setting up and releasing context at eMBMS session establishment and termination. The SGi-mb interface may support the eMBMS traffic plane (i.e., the transfer of eMBMS data packages). As illustrated, the BM-SC 108 may be communicatively coupled to various content providers 114 (e.g., a content provider server), and may further be coupled to a packet data network (PDN) gateway 116 via an SGi interface. The BM-SC 108 may be configured to implement embodiments described herein, and may more generically be referred to as a 'network controller'. In other embodiments, 'network controller' may refer more generally to combinations of network components described in FIG. 3. For example, 'network controller' may refer to any combination of the BM-SC 108, the Content Providers 114, the MBMS GW 104, the MME 112, the MCE 110, the PDN Gateway 116, and/or the BS 102. Generally, any one or more of the network entities 102-114 illustrated in FIG. 3 may be considered a network controller and may be configured to implement intelligent eMBMS and/or user-initiated eMBMS, according to embodiments described herein.

In various embodiments, some or all of the network components of FIG. 3 (e.g., the BS, MCE, MME, MBMS GW, BM-SC, Content Providers, and/or PDN Gateway) may be collocated, and may be communicatively coupled wirelessly or through wired communication.

Figure 4:
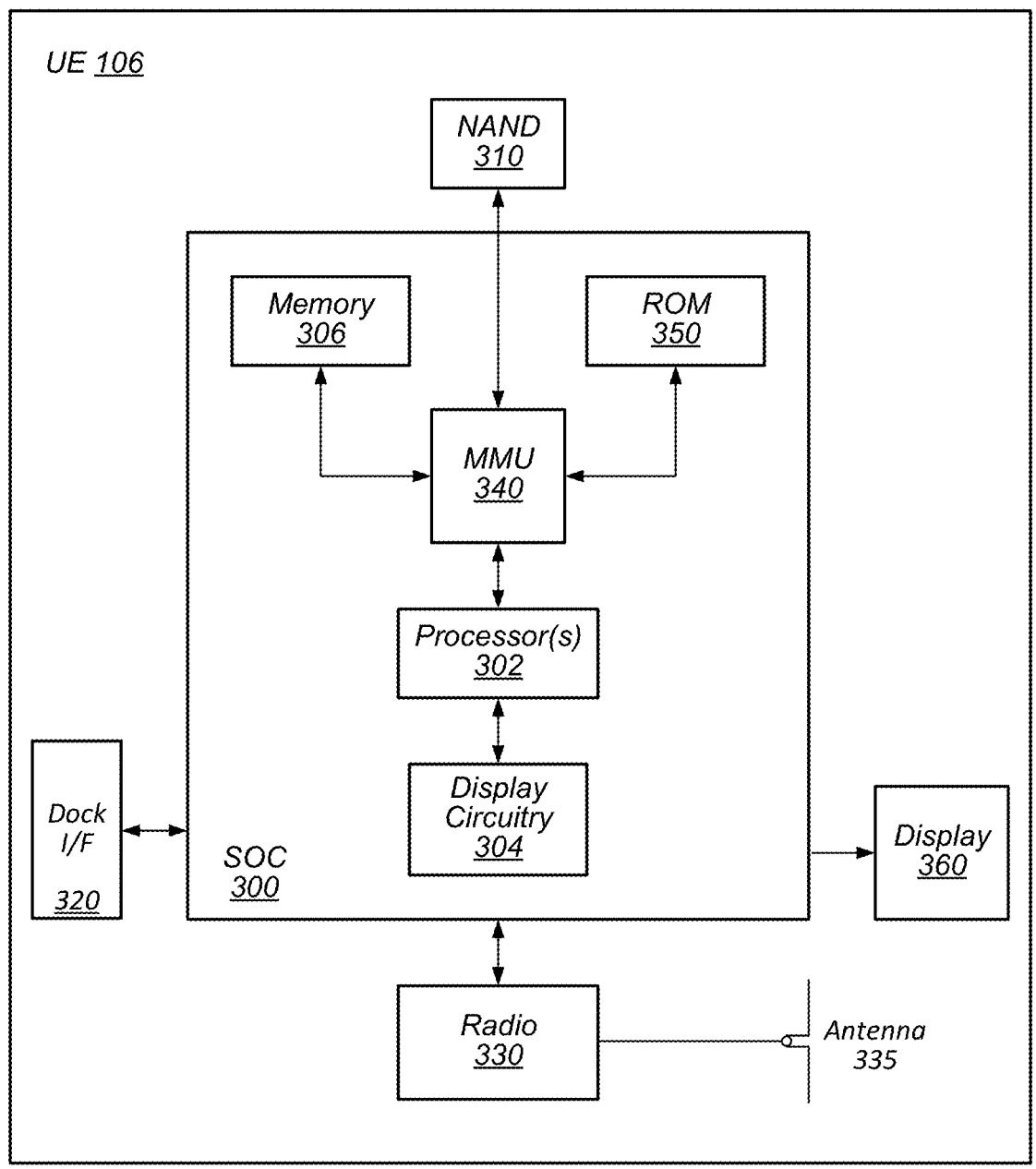
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 300, which may include portions for various purposes. For example, as shown, the SOC 300 may include processor(s) 302 that may execute program instructions for the UE 106 and display circuitry 304 that may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities) for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for eMBMS, such as those described herein with reference to, inter alia, FIGS. 8-9. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 8-9.

Figure 5:
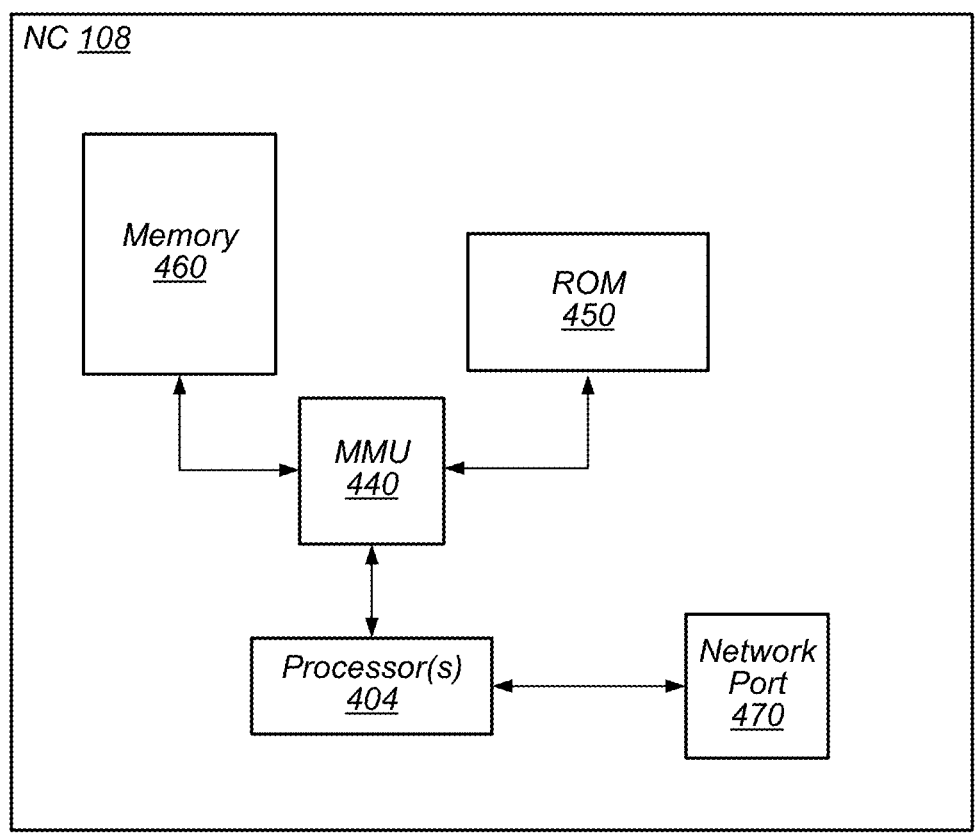
FIG. 5 illustrates an exemplary block diagram of a network controller, according to some embodiments.

FIG. 5—Exemplary Block Diagram of a Network Controller

FIG. 5 illustrates an exemplary block diagram of a network controller (e.g., such as a BM-SC), according to some embodiments. It is noted that the network controller of FIG. 5 is merely one example of a possible network controller. More generally, a network controller may be any network infrastructure component or combination of network infrastructure components configured to implement intelligent eMBMS or user-initiated eMBMS, according to embodiments herein. As shown, the network controller 108 may include processor(s) 404 which may execute program instructions for the network controller. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The network controller may include at least one network port 470. The network port 470 may be configured to couple to a cellular or IP network to receive data packages from content providers. The network port 470 (or an additional network port) may also or alternatively be configured to couple to a PDN Gateway through an SGi protocol, and/or an MBMS GW through each of an SGmb and a SGi-mb protocol, as variously described above in reference to FIG. 3.

Figure 8:
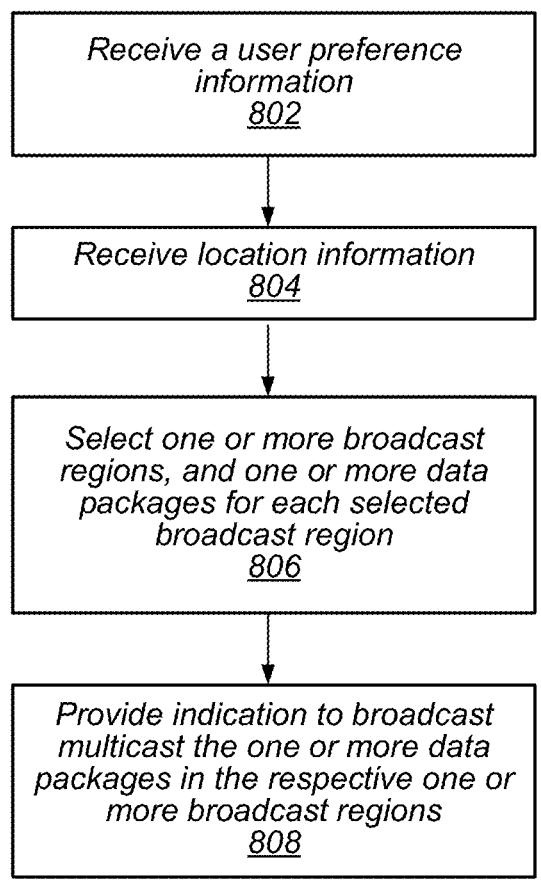
FIG. 8 is a flowchart diagram illustrating an exemplary method for a network controller to implement intelligent eMBMS, according to some embodiments.
Figure 9:
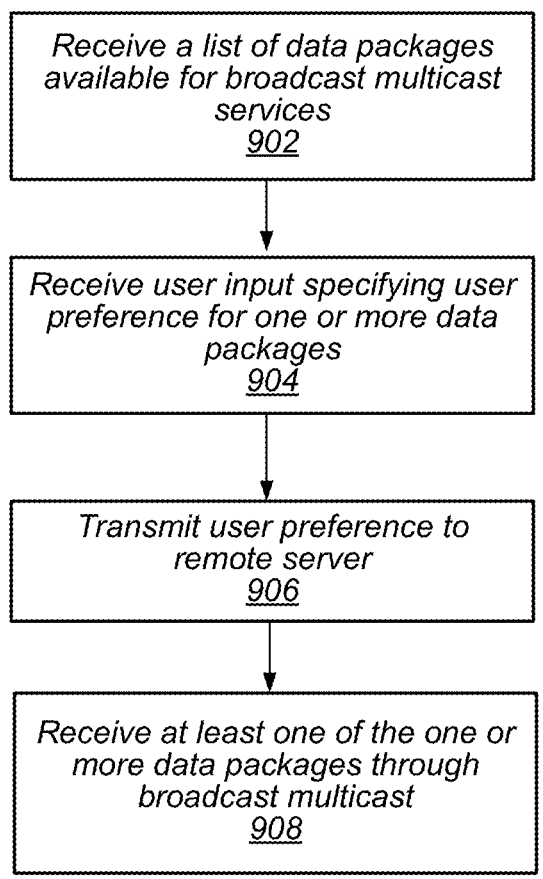
FIG. 9 is a flowchart diagram illustrating an exemplary method for a UE to implement intelligent eMBMS, according to some embodiments.

The network controller may include hardware and software components for implementing or supporting implementation of features described herein, such as those described herein with reference to, inter alia, FIGS. 8 and 9. The processor 404 of the network controller may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the network controller, in conjunction with one or more of the other components 440, 450, 460, and/or 470, may be configured to implement or support implementation of part or all of the features described herein.

In some embodiments, the network controller may be a cloud server (such as the Apple iCloud™ server or another cloud server) that is connected to an enhanced multimedia broadcast multicast services (eMBMS) network. In some embodiments, the network controller may be a content provider server (e.g., a server associated with an application such as HTTP Live Streaming (HLS), FaceTime™, iTunes™, an app store, etc).

Background of Enhanced Multimedia Broadcast Multicast Services (eMBMS)

Enhanced multimedia broadcast multicast services, or eMBMS, is a 3GPP technology that allows broadcasting and/or multicasting of data or video to multiples users in a predefined area. In current implementations, eMBMS may reuse existing LTE network infrastructure. In some embodiments, eMBMS may be transmitted over the air using a specific subframe format, such as multicast control channel (MCCH), or multicast traffic channel (MTCH). In some implementations, eMBMS subframes may be used in up to 60% of overall evolved node B (eNB) transmission occasions.

In existing 3GPP implementations, eMBMS has been designed in order to improve the spectrum usage for the carrier. Typically, eMBMS may operate as follows. A network may detect a number of users that are accessing the same data in the same area. For example, these users may be served through multiple unicast flows containing the data. In order to improve radio resource allocation, if the number of users accessing the same data in the same area is larger than a first threshold, the network may decide to convert these multiple unicast flows into a single multicast flow that could be received by all interested users.

If the number of users (or UEs) consuming the multicast flow drops below a second threshold (which may be the same or different from the first threshold), the network may determine it is no longer advantageous to perform multicast traffic, and the network may stop multicast traffic. In this case, users still interested may be required to create independent unicast flows to obtain the desired content.

During a multicast session the network may determine the allocation mix between multicast subframes and unicast subframes. In some implementations, the multicast ratio may range from 10% to 60% (or another range) depending on current transmission requirements, and the network may typically serve both unicast and multicast/broadcast customers in the area using the same eNBs.

While existing eMBMS implementations offer advantages over a purely unicast methodology, there are areas wherein eMBMS implementation may be improved. For example, in existing implementations, a threshold number of users may need to currently access the same data through individual unicast communications before eMBMS multicasting may be initiated. Radio resources may be more efficiently allocated if it is intelligently determined which data to transmit using multicast before the data is inefficiently transmitted (e.g., partially transmitted) via unicast communications. These and other improvements are explained in further detail below.

Applications of eMBMS eMBMS may be employed in a variety of different applications. Broadcast/streaming applications are the main and dominant applications for eMBMS. Broadcasts may be employed at a range of different scales. For example, venue-specific broadcasts may be employed within a sports arena to broadcast content related to an ongoing sports event, such as enhanced coverage with multiple cameras, replays, and relevant statistics. Additionally or alternatively, region-specific broadcasts may be employed in a city or metropolitan area to broadcast content relevant to the city or metropolitan area, such as home team sports games, local events, and local news. As another possibility, eMBMS may be used for nation-wide broadcasts, such as sporting events with national viewership (e.g., the Super Bowl, or the World Series), or other nationally relevant content such as the State of the Union Address. eMBMS may additionally be used to distribute breaking news and urgent public safety announcements (e.g., weather advisories, earthquake notifications, dangerous persons alerts, etc.) at either a venue, regional, or national level of deployment.

In some embodiments, eMBMS may also be used to deliver non-audio video common content to users. For example, push media, epublications distributions, and OS/App software distribution may be distributed using eMBMS. These may include daily local updates for "Nearby" and/or "Search" map services (for example, to distribute information related to local events and/or local tourist information), pre-caching of popular new music within a music application installed on a UE device, new shows and featured content pre-caching in the device, local live broadcasting service (e.g., using FaceTime or another application for either enterprise or public use). Depending on the particular application of eMBMS, some changes may be required to backend systems and/or the network.

Additionally, eMBMS may be used in collaborative or distributed learning applications. As described in greater detail below, collaborative or distributed learning is used in some embodiments to employ crowd-sourced machine learning, wherein weights and parameters of a machine-learning algorithm are trained in a distributed manner by a plurality of participating UEs. In these embodiments, and as explained in further detail below, eMBMS may be used to efficiently broadcast multicast updated parameters of the machine learning model to the participating UEs.

Intelligent Content Selection for eMBMS

Embodiments herein present novel methods and devices for employing an improved eMBMS that intelligently anticipates specific types of data to be multicast in specific service areas. As may be appreciated by one of skill in the art, eMBMS is a specific type of broadcast and/or multicast protocol, and embodiments herein may more generally be applied to any type of broadcast and/or multicast protocol. For simplicity and concreteness, embodiments herein are described specifically in terms of the eMBMS protocol. However, it may be appreciated by one of skill in the art that any methods and devices described in terms of eMBMS may be more generally applied to any broadcast and/or multicast communication protocol.

In existing implementations, eMBMS was designed for carrier capacity management. Currently implemented 3GPP procedures assess the number of users accessing the same streaming service using unicast, and when the number reaches a threshold, the network switches the user to eMBMS to have a gain in capacity. Embodiments presented herein improve on existing implementations by intelligently determining which content may be advantageously transmitted via eMBMS, without having to first (inefficiently) service a threshold number of UEs via unicast services before switching to eMBMS.

In some embodiments, a carrier may provide an eMBMS option to users in its service plan for free or for a fixed fee. In these embodiments, the eMBMS traffic may not be counted in the overall unicast plan of the user receiving the broadcasted data (e.g., data downloaded via eMBMS may not count toward data limits associated with the users data plan). In some embodiments, the carrier may reserve some eMBMS capacity for a particular third-party enterprise based on a prior commercial agreement.

In implementing embodiments herein, new mechanisms may be desirable on the UE side and the network side to assess users' preference in real time within an eMBMS area. In some embodiments, the assessment is done through artificial intelligence and/or UE/server communications. For example, as described in further detail below, a UE with eMBMS services enabled may transmit preference information to a server indicating which data packages or types of data packages it prefers to receive via eMBMS.

Intelligent eMBMS Signaling and Infrastructure

Implementation of methods for intelligent eMBMS allocation may be accomplished using specific types of signaling and infrastructure.

On the network side, content servers associated with the applications running on the UE which may implement eMBMS (e.g., content servers associated with a map application such as Apple Maps™, a music application such as iTunes™, or an app store application such as the Apple Store™, among other possibilities) may be connected to a network controller such as a carrier broadcast multicast service center (BM-SC or BMSC 108). Alternatively, in some embodiments, the content servers may themselves function as the network controller to implement methods described herein. In some embodiments, an eMBMS interface such as an xMB interface may be deployed within a content server. In some embodiments, a new interface may be defined between the content servers and various third parties such as a public institute or a business owner to update and/or refresh some of the broadcasted information.

In some embodiments, a new message (e.g., transmitted through HTTPS, SMS, or another means) may be used to provision the devices daily (or at another rate) with the list of available files to stream within different geofencing locations (such as video, music, apps, and/or OS updates).

Figure 6:
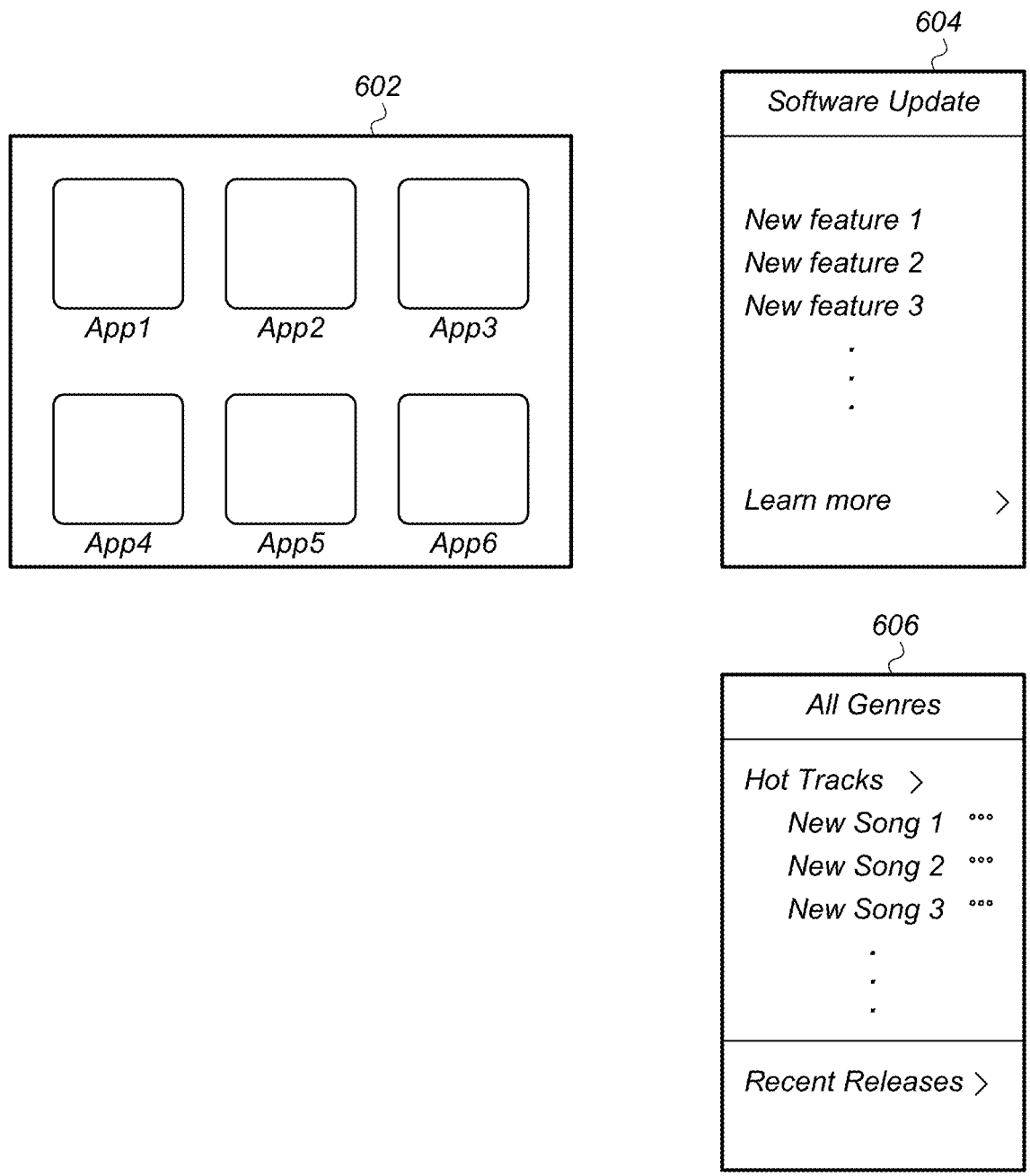
FIG. 6 illustrates various user interface displays showing new app updates, software update, and new songs potentially available for eMBMS, according to some embodiments.

On the UE side, additional infrastructure may be required to implement intelligent eMBMS allocation in addition to supporting basic 3GPP eMBMS and eMBMS Middleware. For example, in some embodiments, the UE should be enabled to receive HTTPs messages from content servers with the list of files (e.g. data packages) to potentially distribute via eMBMS within different geofencing locations (such as video, music, apps, updated machine learning models, and/or OS updates). For example, as illustrated in FIG. 6, a display of the UE may present a list of application 602 which have updates that are available via eMBMS, and a particular application update or software update 604 may be displayed illustrating additional features associated with the update. In some embodiments, a UI for a music application, for example, may display 606 a list of new popular songs (e.g., wherein the list is populated by a message received from a content server) which may potentially be available for download via eMBMS. In some embodiments, the UE may be enabled to define user preference (e.g., by accepting user input specifying user preference) for receiving various data packages or types of data packages among the provided list of files from the server. In some embodiments, this may be done at the OS level.

In some embodiments, when the UE reaches a geolocation where a content server(s) related to an application installed on the UE is available, the UE may inform the content server(s) of its preferred files to receive via eMBMS and its geolocation.

In some embodiments, as described in further detail below, the content servers compile the information received from the devices, and make a decision on the most appropriate files/media to broadcast for each geolocation area (broadcast area). At this time, the content server may initiate and start the eMBMS session in the area with the network controller.

Figure 7:
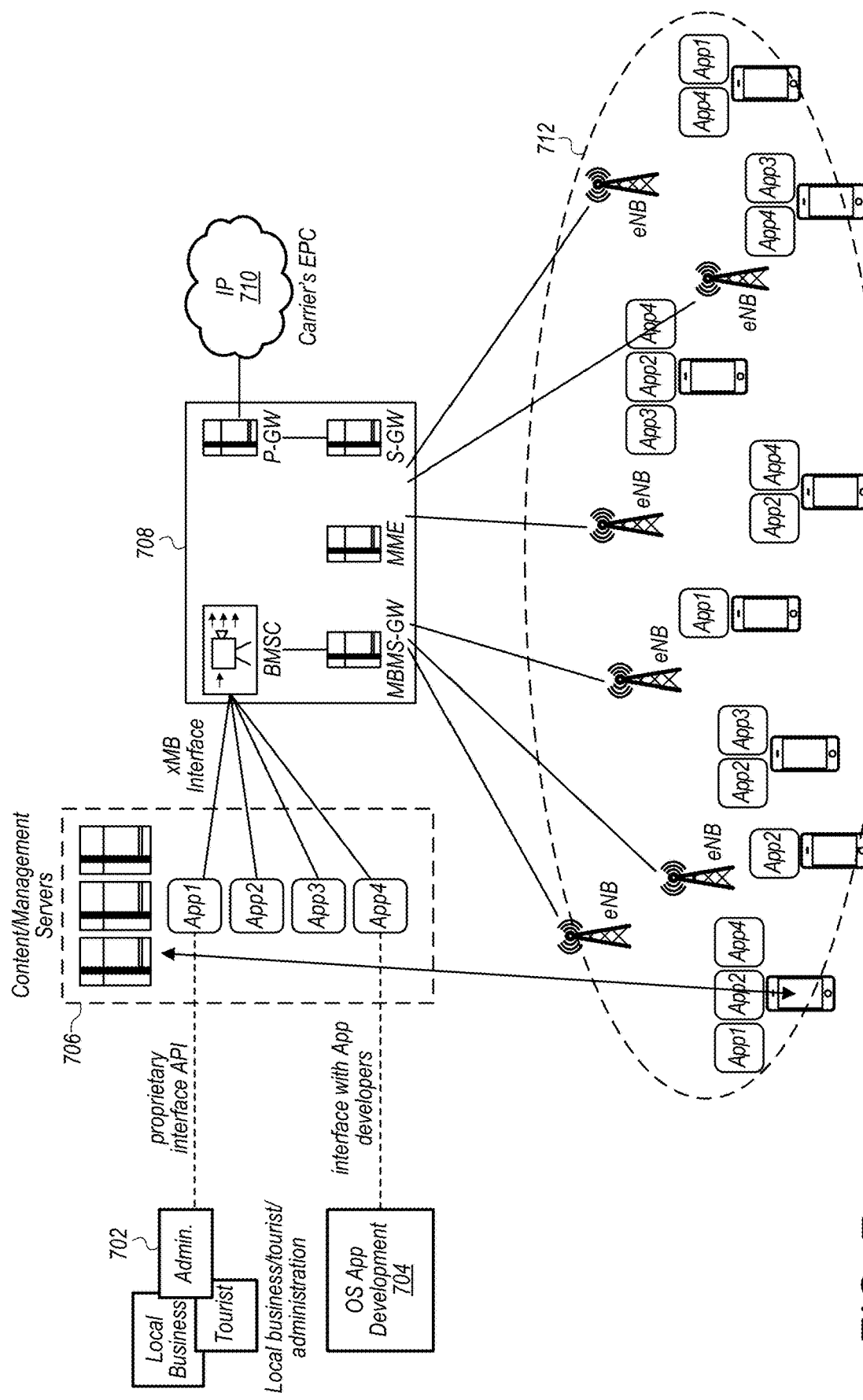
FIG. 7 illustrates a detailed wireless communication system configured for intelligent eMBMS, according to some embodiments.

FIG. 7—Detailed Wireless Communication System for Intelligent eMBMS

FIG. 7 is a detailed illustration of an exemplary wireless communication system configured to implement intelligent eMBMS, according to some embodiments.

As illustrated, various local businesses, tourist institutions, and/or administration entities 702 may interface with content and/or management servers 706, to provide data content for eMBMS. Additionally, an operating system application developer 704 may interface with content and/or manager servers, for transmission of data related to OS and/or app updates. The content/management servers 706 may transmit specific data packages related to various applications to a BMSC comprised within a network controller 708 via an xMB interface. Each of a plurality of UEs within a service area may additionally provide user preference information related to one or more applications and location information to the content/management servers 706 and/or the network controller 708. The UEs may provide the user preference information through a cellular connection with an eNB, or alternatively the UEs may utilize a wired or wireless IP connection to provide the user preference information. The network controller 708 may additionally be connected through the internet to an evolved packet core 710 associated with the cellular carrier. The network controller 708 may notify a plurality of eNBs of specific data packages to transmit using eMBMS to the UEs within the service area, based on the user preference information. The UE may use artificial intelligence and/or machine learning mechanisms in the OS or the UE to determine user preference information. Alternatively or in addition, the UE may use user preference (e.g., user input specifying user preference) to determine user preference information, and/or the UE may use a preloaded description of available medias to create user preference information. The preloading of media descriptions may be performed through cellular unicast, through WiFi, or through any other unicast communication medium.

FIG. 8—Flowchart for Network Controller to Implement eMBMS

FIG. 8 is a flowchart diagram illustrating a method for a network controller to intelligently direct eMBMS communications, according to some embodiments.

At 802, the network controller may receive user preference information from each of a plurality of UEs. The user preference information may be received via a base station or base stations that are in communication with the plurality of UEs. Alternatively, the user preference information may be received by a direct connection between the network controller and the plurality of UEs (e.g., through an internet protocol (IP) connection such as HTTP, or another type of wireless connection). The user preference information may indicate, for each UE, a list of data packages or types of data packages that the respective UE prefers or desires to receive through eMBMS. For example, as described in greater detail below, the user preference information may indicate a preference to receive via eMBMS communications specific OS or application updates, music tracks or album downloads, map application updates, TV show episodes or other video content, and/or a list of commercial offers, touristic information, and/or local information, updated machine learning models related to one or more different machine learning algorithms configured to operate on the UE, among other possibilities. The user preference information may further specify preferred times of day for participating in multicast and/or broadcast downloads. The user preference information may further specify, or be accompanied by information that specifies a mobility state of the UE.

At 804, the network controller may receive location information from at least a subset of the plurality of UEs. For example, a subset of the plurality of UEs may send information identifying their respective locations. In various embodiments, the location information may be sent concurrently, sequentially, separately, or in the same communication as the user preference information.

At 806, the network controller may select one or more broadcast regions, and one or more data packages for each selected broadcast region, for performing eMBMS based on the user preference indication and the location information. The one or more broadcast regions may be selected from a plurality of potential broadcast regions that are known to the network controller, each of which broadcast within a known region or location. The plurality of broadcast regions may be associated with a respective plurality of base stations, each of which is configured to broadcast within a respective broadcast region. Alternatively or additionally, a single base station may be configured to separately broadcast into multiple broadcast regions.

The one or more broadcast regions may be selected based on a number of UEs located in a respective broadcast region whose user preference indication indicates a preference for a common data package or data package type to be received through eMBMS. For example, for each of the plurality of broadcast regions, the network controller may determine from the location information the number of UEs that are located within the respective broadcast region. For these UEs located within the respective broadcast region, the network controller may compare their associated user preference information to determine, for each data package which is desired to be received by at least one these UEs, how many UEs desire to receive a common respective data package via eMBMS. If the number of UEs located within the broadcast region that desire to receive a particular data package is greater than a predetermined threshold number of UEs, the network controller may select the respective broadcast region for performing eMBMS, and the network controller may further select the particular data package for broadcasting and/or multicasting in the respective broadcast region. In other words, the network controller may select the respective broadcast region for performing broadcast and/or multicast services if a number of UEs located in the broadcast region that are associated with user preference information indicating a preference for receiving a common data package or data package type is greater than a predetermined threshold.

In some embodiments, the one or more data packages are selected by the network controller from a set of potential data packages and/or types of data packages available for eMBMS received from one or more remote devices. For example, various remote devices associated with each of a plurality of different data packages and/or types of data packages may communicate a list of data packages and/or types of data packages that may potentially be communicated using eMBMS. As one non-limiting example, a remote device associated with a music application may send a list of popular new songs to the network controller, as these songs may potentially be selected for communication using eMBMS.

In some embodiments, and as described in further detail below under the heading "User-initiated eMBMS", selecting one or more broadcast regions and one or more data packages is further based at least in part on a negotiation process between the network controller and the one or more remote devices. For example, a remote device may negotiate with the network controller to select a particular data package to communicate in a particular broadcast region using eMBMS.

The network controller may repeat this data package selection process for each data package that is desired for broadcast and/or multicast reception by at least one UE located in the broadcast region, as indicated in the user preference information. The network controller may then further repeat the broadcast region selection process for each of the plurality of broadcast regions.

In some embodiments, the network controller may be enabled to start/stop an eMBMS session within an area and select the most appropriate data to broadcast, based on local users preference and preferred media at various times of the day.

In some embodiments, the network controller may have proprietary mechanisms to assess and collect users eMBMS preferred data packages to determine the best traffic to send over eMBMS. In some embodiments, the UEs' mobility and battery status may also be used to assess the users' preference for eMBMS services. For example, the plurality of UEs may additionally communicate mobility information (e.g., indicating a low, mid or high level of mobility or movement) and/or battery status to the network controller. In these embodiments, the cloud server may give stronger consideration for a particular UE's preference information if the UE is static, or is in a lower mobility state. A UE in a higher mobility state (e.g., if the UE is driving in a car or riding on a bus, etc.) may move outside the eMBMS broadcast area before it receives or finishes receiving the eMBMS data, so effective radio resource allocation and/or the user experience may be improved if fast-moving UEs are ignored or are given a weaker consideration for eMBMS resource allocation (e.g., for broadcast area and data package selection).

The network controller may further give a weaker consideration to user preference information originating from a UE with a low battery status, since these UEs may not have sufficient battery power to participate in eMBMS.

In some embodiments, the network controller may require that a predetermined threshold number of data packages be selected for a particular broadcast region before the broadcast region is selected for eMBMS. For example, the network controller may require that 2 or more data packages (or 3 or more, or another threshold) are desired by a threshold number of UEs located within the broadcast region before the broadcast region (and the respective data packages) are selected for eMBMS.

In some embodiments, two or more broadcast regions may partially or fully overlap in their respective covered broadcast areas. In these embodiments, the network controller may perform the data package selection process described above specifically for the region of overlap of the two or more broadcast regions. For example, the network controller may determine, for the UEs that are located in the overlap region, whether a threshold number of these UEs have indicated a preference for receiving a common data package via eMBMS. If a threshold number of UEs located in the overlap region have indicated a preference for receiving a particular data package via eMBMS, the network controller may select each of the overlapping broadcast regions for broadcasting the data package. In some embodiments, the network controller may determine additional configuration and/or parameter settings associated with each overlapping broadcast region, so that the overlapping broadcasts are able to coherently overlap. For example, the network controller may determine various co-transmission parameters such that the separate overlapping broadcasts of the data package constructively interfere and result in a stronger broadcast signal.

At 808, the network controller may provide, to a multicast gateway, an indication of the selected one or more broadcast regions and their respective one or more data packages. The indication may instruct the multicast gateway to direct one or more base stations to perform eMBMS in the one or more broadcast regions, for their respective one or more data packages. In some embodiments, the indication may further contain configuration and/or parameter settings associated with co-transmission for overlapping broadcast regions, as described above. In some embodiments, the indication may further contain timing information regarding when to perform the broadcasting of each selected data package in each selected broadcast region. For example, the timing information may be preconfigured between the network controller and the plurality of UEs, so that the UEs may be informed of when to monitor for potential eMBMS data packages.

FIG. 9—Flowchart for UE to Implement eMBMS

FIG. 9 is a flowchart diagram illustrating a method for a UE to participate in intelligent eMBMS, according to some embodiments.

At 902, the UE may receive a list of data packages or types of data packages available for eMBMS. The list may be received wirelessly from a remote server via a cellular connection with a base station, or it may be received via another type of connection (e.g., through the internet). The list of data packages may be periodically received, and the list may contain a plurality of data packages or types of data packages that may potentially be broadcast through eMBMS. For example, the UE may receive a daily list (or weekly, or with another regular or irregular periodicity) of each data package that is available for eMBMS. The data packages may be any of OS or application updates, songs, albums, videos, local map updates, updated machine learning models, or another type of data package that the UE may desire to download. Alternatively or in addition, the list may specify types of data packages rather than specific data packages. As one non-limiting example, the list may specify a category of song or album, rather than a specific song or album. Similarly, the list may generally specify updates for a particular OS or application installed on the UE, without specifying a specific update for the OS or application.

At 904, the UE may receive user input specifying user preference information for one or more data packages and/or types of data packages to be received via eMBMS. For example, a user of the UE may be prompted on a display to select preference for receiving any of a variety of data packages and/or types of data packages via eMBMS.

At 906, the UE may transmit the user preference information to a remote server. The user preference information may be transmitted wirelessly through a base station, or through an IP connection or another type of connection. The user preference information may be received (either directly or indirectly) by a network controller that is configured to control eMBMS or other broadcast and/or multicast services, as variously described above. The user preference information may be transmitted concurrently or separately from location information of the UE, mobility information of the UE, and/or battery level information of the UE, which may be also transmitted to the remote server, according to various embodiments.

For example, in some embodiments the UE may be further configured to determine a location of the UE, and transmit the location of the UE concurrently with or sequentially relative to the transmission of user preference. In these embodiments, as described below, receiving at least one of the one or more data packages through eMBMS may be further in response to transmitting the location of the UE. In other words, location information of the UE may be used to determine one or more broadcast areas for transmitting the one or more data packages through eMBMS.

In some embodiments, the UE may be further configured to determine that the UE has entered a location where broadcast and/or multicast services are available. As one example, a base station may transmit a notification to camping UEs that the base station is configured to participate in eMBMS. Alternatively, a UE may be preconfigured with a list of eMBMS-enabled locations, and may determine that it has entered a location where broadcast and/or multicast services are available based on a determined location of the UE. In these embodiments, the UE may be further configured to transmit its user preference to the remote server at least in part based on a determination that the UE has entered a location where broadcast and/or multicast services are available.

In some embodiments, the UE may be further configured to determine a degree of movement of the UE, and may transmit the degree of movement of the UE concurrently with or sequentially to the transmission of user preference. In these embodiments, as described below, transmitting at least one of the one or more data packages through broadcast and/or multicast is further in response to transmitting the degree of movement of the UE. In other words, mobility information of the UE may be used to adjust a strength of consideration by a network controller for the respective UEs' user preference information in determining whether to transmit the one or more data packages through eMBMS.

In some embodiments, UE battery status may be used by the UE to decide whether the UE should send its user preference information to the network controller. For example, since eMBMS traffic may be received in both idle and connected mode, enabling eMBMS may impact the battery and power consumption of the UE. In order to avoid an undesirable drain to the battery, and a negative experience for the user, a UE with a low battery may avoid participating in the transmission of user preference information for eMBMS to the network controller, and may further avoid receiving data packages through eMBMS.

In other embodiments, the UE may transmit its battery status concurrently with or sequentially to the transmission of user preference. In these embodiments, the battery status may be used to determine by a network controller which one or more data packages to communicate using eMBMS.

At 908, the UE may receive at least one of the one or more data packages through eMBMS, or through another type of broadcast and/or multicast service. The one or more data packages may be received at least in part in response to the transmission of user preference and/or location information to the remote server. For example, the one or more data packages may be received via eMBMS based on the user preference information of the UE indicating a preference for receiving the respective data package via broadcasting and/or multicasting. The one or more data packages may also be received based on location information sent by the UE. In some embodiments, the UE may determine when to receive the one or more data packages based on information received from the remote server. For example, the received list of data packages may further contain timing information associated with each data package on the list of data packages, and the UE may determine when to receive the one or more data packages based on the timing information.

Types of Data Packages

Various types of data, or data packages, may be advantageously transmitted through intelligent eMBMS, according to various embodiments. In some embodiments, eMBMS may be intelligently enabled for OS or application updates. For example, UE devices are typically required to periodically download updates for an operating system (OS) installed on the UE (e.g., iOS™, Android™, or another OS) and/or for various applications installed on the UE. The lengthy delay that can accompany application and/or OS updates and/or installs has been identified as a user experience issue in UE devices. In some embodiments, scheduled OS security updates, carrier bundles, and/or new OS versions updates may be potential data packages for eMBMS. In other embodiments, a updates for a particular application that is known by the network to be downloaded on a large number of UEs in a particular broadcast region may be potential data packages for eMBMS. Because these types of updates may be used by most or many users of devices with a particular OS or with a particular application installed within a certain region, radio resources may be more efficiently allocated by broadcasting the update(s) through multicast. For example, this may save radio resources by not inefficiently transmitting the update(s) through individual unicast transmissions until a threshold number of users are receiving individual unicasts. Rather, the network may determine to initially utilize multicasting and/or broadcasting based on the number of UE devices in a particular region that are anticipated to require the update.

In some embodiments, this may improve the user experience and reduce the delay needed to update the OS and popular Apps. Carriers may also benefit from this feature as it may reduce the number of unicast downloads of the same content, thus reducing radio resource expenditure.

In some embodiments, eMBMS may be intelligently enabled for local map updates. For example, a map application (e.g., Apple Maps™, Google Maps™, or another map application) installed on a UE may be configured to update periodically (e.g., daily or weekly, etc.). If a UE enters an area that is serviced by eMBMS, the UE may indicate a preference to receive data packages comprising local map updates that may be sent directly to a map application or POP in the user interface, for example. In various embodiments, the update may be provisioned by either carriers, a cloud service, local administration or third party entities such as local business.

In some embodiments, eMBMS may be intelligently enabled for popular music downloads. For example, a music-related application (e.g., Apple Music™, iTunes™, or another music application) on a UE may periodically display popular new songs and/or albums on a user interface (UI), which a user may want to download. In some embodiments, a user may select a preference to automatically receive data packages of certain popular music files through eMBMS. For example, in some embodiments, streaming of new Hot Tracks, Top 10 and/or Beats-1 radio (or other categories of popular music) may be done over eMBMS. According to a user's selected preference, various categories of new music may be automatically preloaded onto the UE through eMBMS services. In some embodiments, the user may select which of various genres, artists, albums, songs, podcasts and/or categories of music to automatically download through eMBMS. In these embodiments, user experience may be improved and the carrier may more efficiently allocate spectrum usage.

In some embodiments, eMBMS may be intelligently enabled for popular video content. For example, users may indicate a preference on their UEs for pre-caching or downloading data packages comprising new or popular TV show, TV series episodes, or other video content. These UE may be detected within a predefined eMBMS Area, and based on their indicated preferences, popular video content may be preloaded through eMBMS services.

In some embodiments, eMBMS may be intelligently enabled for distributed learning applications, such as for crowd machine learning (ML) and/or crowd computing. In some embodiments, eMBMS may be used to broadcast ML models and/or common data to a large number of participating UEs. The UEs may update and/or retrain the model using their own respective local measurements and/or data, thereby obtaining updated parameters of the ML model. Some of the UEs may occasionally or periodically send their updated parameters back to the network controller or server. In some embodiments, the updated parameters may be transmitted concurrently with location information, movement information, or other information related to the UE. In some embodiments, the UEs may only send updated parameters which have changed from a previous round of learning (e.g., to reduce uplink radio resource expenditures). The UEs may additionally send error metric(s), other meta data, and/or time stamps.

The network controller may then use the updated information received from the UEs in a fusion algorithm to merge and/or fuse the plurality of received updated information (from the different participating UEs) to generate a new baseline model. For example, the network controller may perform gradient aggregation using updated parameters received from a plurality of UEs and may update the ML model based on the gradient aggregation. The network controller may select one or more broadcast regions within which to perform broadcast multicast services based at least in part on location information received from the UEs. The network controller may further select one or more of the updated machine learning models to broadcast and/or multicast in the one or more selected broadcast regions based on the updated parameters and the location information. For example, the network controller may receive updated parameters related to one or more machine learning models from a plurality of UEs located in a plurality of different broadcast regions. The network controller may select which updated ML models to broadcast and/or multicast in which broadcast region(s) based on how many UEs sent updated parameters related to a particular ML model in each broadcast region. The network controller may then provide an indication to a remote device to broadcast and/or multicast the new baseline model using eMBMS to the UEs, thus repeating the update process.

In general, any data package that is anticipated to be desired for download by a large number of users may be considered for multicast and/or broadcast distribution, according to various embodiments.

Figure 10A:
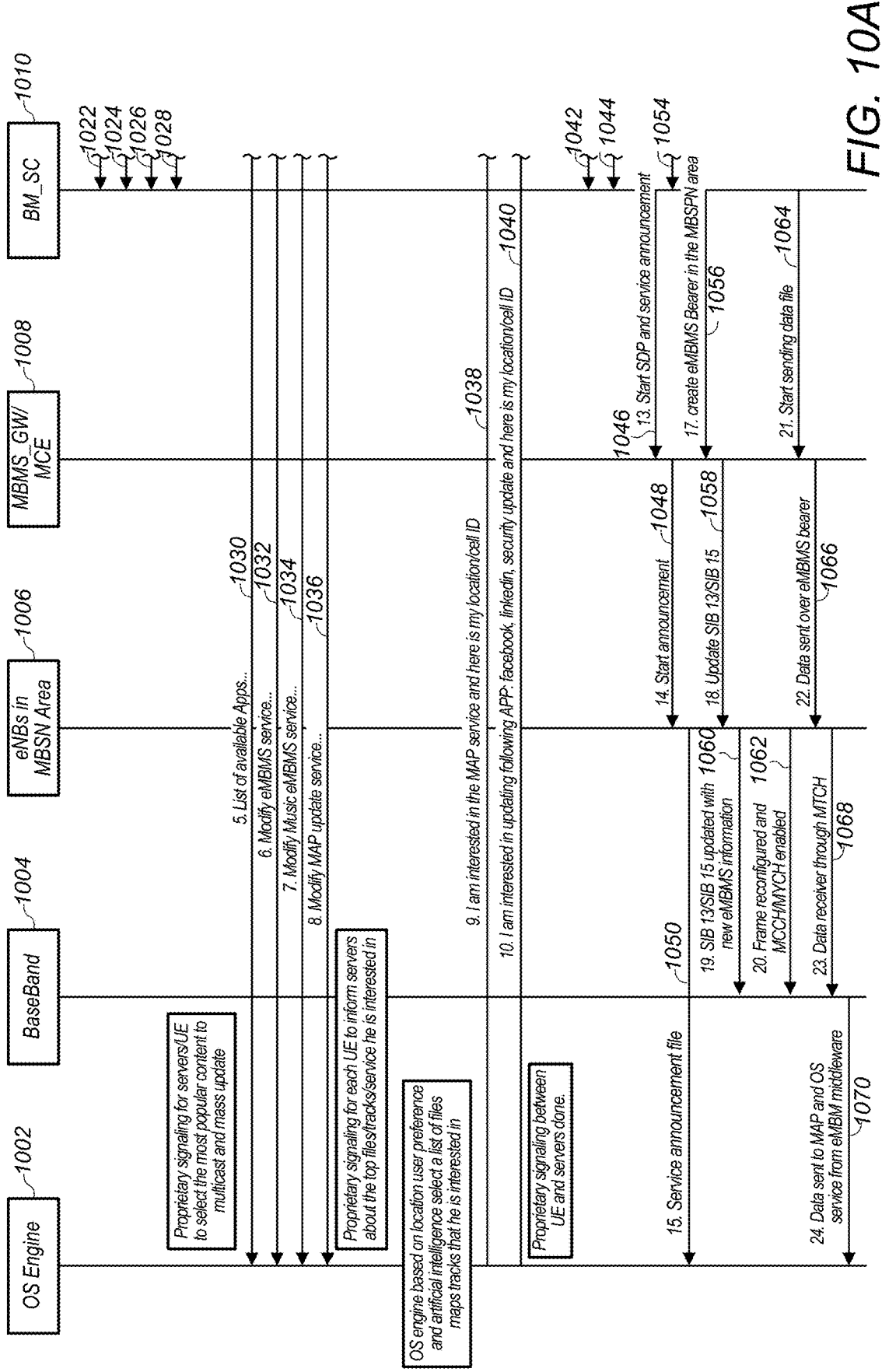
FIGS. 10A-10B are a detailed communication flow diagram illustrating an exemplary method for conducting intelligent eMBMS, according to some embodiments.
Figure 10B:
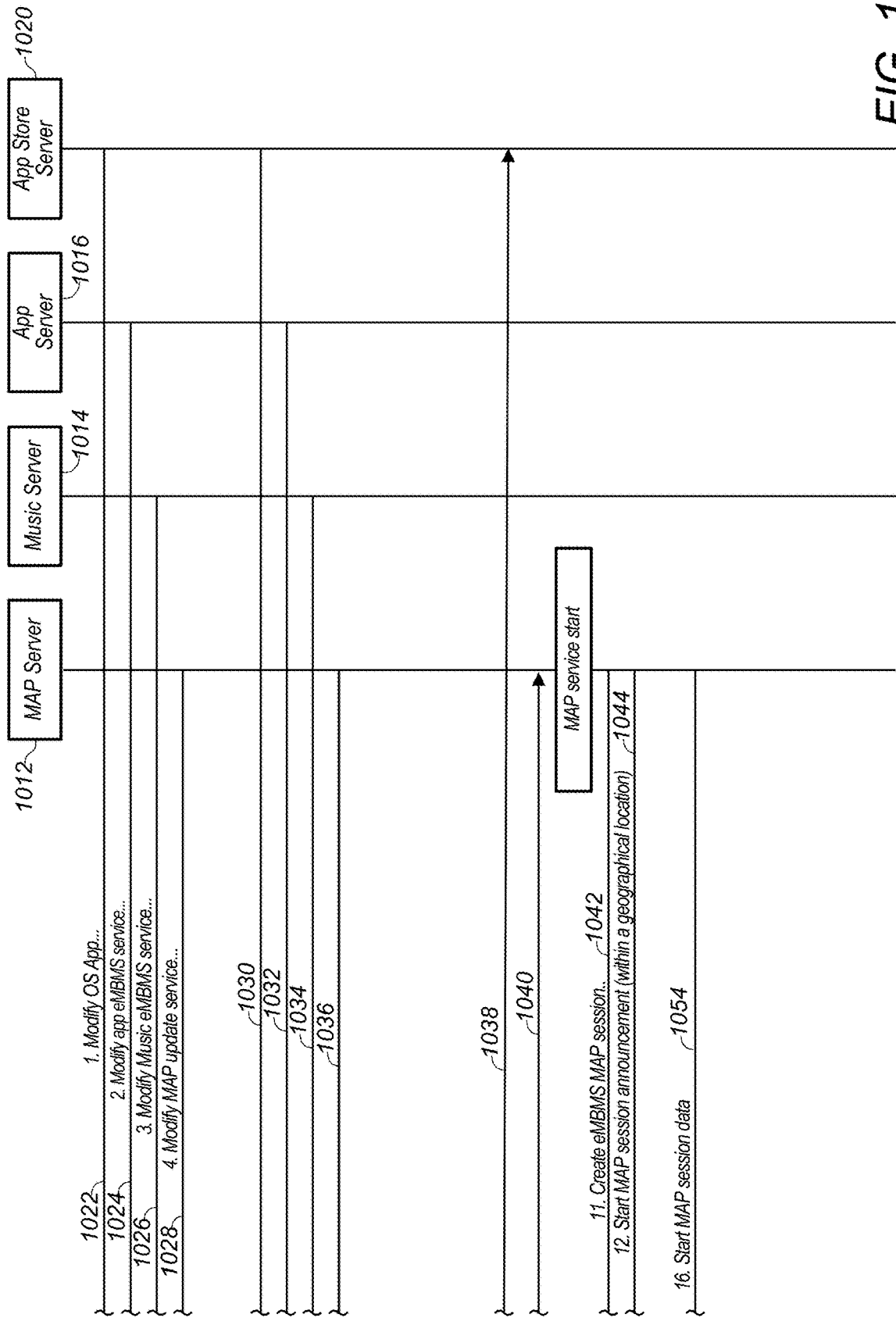

FIGS. 10A-10B—Communication Flow for Intelligent eMBMS

FIGS. 10A-10B are a detailed communication flow diagram illustrating an exemplary method for conducting intelligent eMBMS, according to some embodiments.

As illustrated, at 1022-1028, various content servers 1012-1020 may transmit respective data package updates to the BMSC 1010, indicating potential eMBMS data packages. At 1030-1036, the content servers may additionally supply a list of potential eMBMS data packages to an OS engine of a UE, so that the UE may select a user preference for receiving one or more of the data packages via eMBMS. At 1038, the UE may respond to one or more of the content servers (in the illustrated embodiment, map server 1012 and app store server 1020), indicating a preference to receive their respective data packages via eMBMS.

In the illustrated embodiment, the map server may then send a notification at 1042 to the BMSC to create an eMBMS session for the data package(s) indicated by the user preference, and may further transmit a session announcement at 1044 to the BMSC. The BMSC may then transmit a service announcement at 1046 to the MBMS GW or MCE 1008 to notify the eNBs 1006 in the broadcast area at 1048 (e.g., the multicast broadcast single-frequency network (MBSN) area) who may announce at 1050 the eMBMS session to the UE. The BMSC may then create an eMBMS session at 1056, whereby the MBMS GW may notify the eNBs 1006 to update SIB 13/SIB 15 at 1058. The eNBs may then broadcast new eMBMS information (data packages) to a baseband layer 1004 of the UE, and frames may be reconfigured at 1062 and a multicast control channel/multicast traffic channel (MCCH/MTCH) may be enabled.

Finally, at 1064, the BMSC may start sending the data package(s) to the MBMS GW, which may send the data packages over the eMBMS bearer at 1066 to the eNBs. The eNBS may then use eMBMS to transmit the data packages through a multicast traffic channel (MTCH) at 1068, which may then be received by the baseband 1004 of the UE which may then forward at 1070 the map and OS data from eMBMS middleware to the OS engine of the UE.

User-Initiated eMBMS

Figure 11:
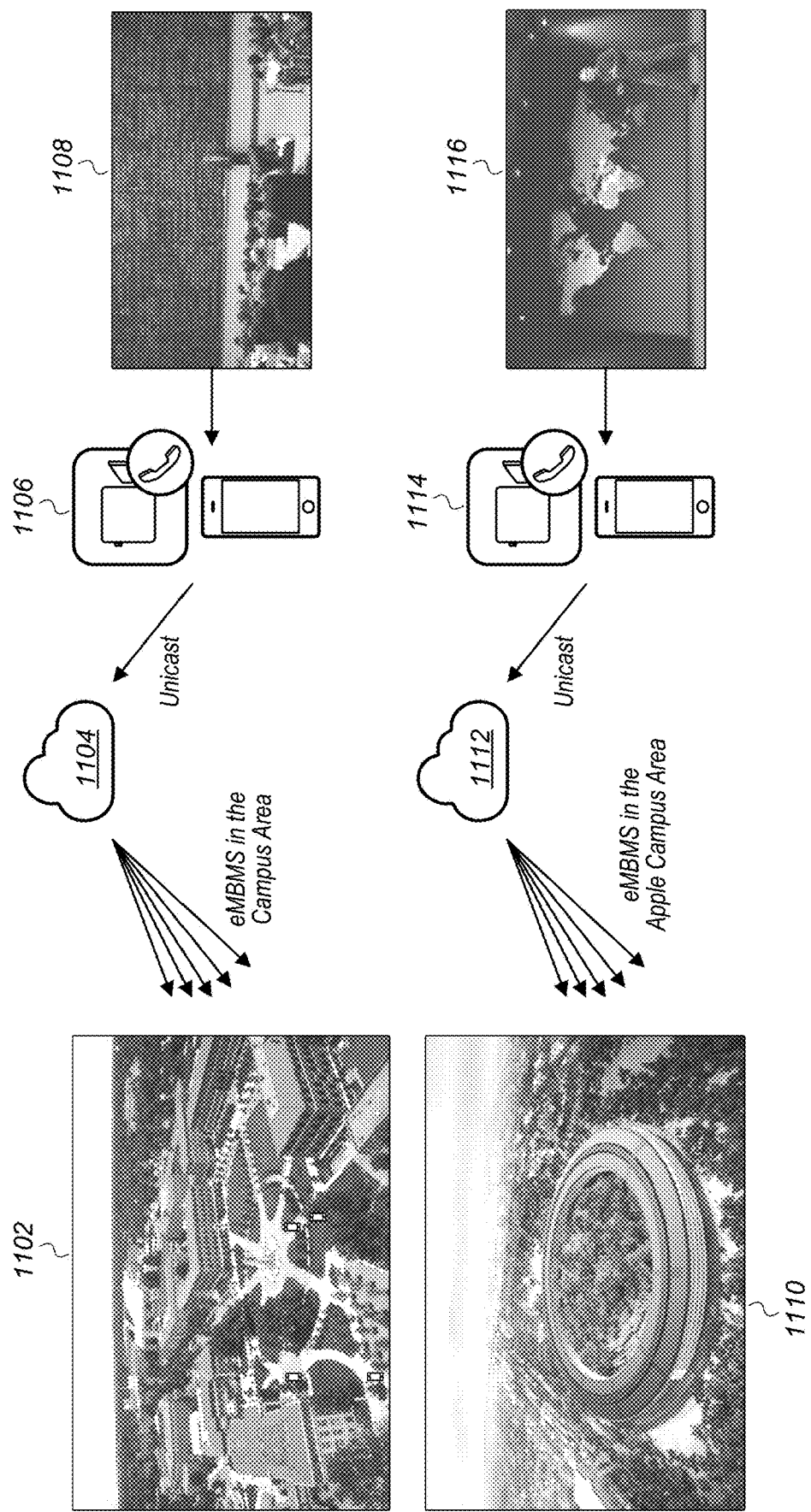
FIG. 11 illustrates exemplary use-cases for user-initiated eMBMS, according to some embodiments.

In some embodiments, user-initiated eMBMS may be intelligently implemented for a local live broadcasting service. For example, in a variety of settings (e.g., college, university, music festivals, keynotes, business shows, etc), it may be advantageous to provide simplified and streamlined tools to allow an organization or user to multicast content within a certain area. For example, as illustrated in FIG. 11, a professor may desire to multicast a video recording of a lecture 1108 to students on campus 1102, or a keynote speaker may desire to multicast a lecture 1116 to attendees of a conference 1110, among other possibilities. In these embodiments, a UE with a video recording application (e.g., FaceTime™, or another video recording app) 1106/1114 may employ eMBMS (via 1104/1112) to easily broadcast a recorded video to a plurality of other UEs, with no additional cost to the other UEs. For ease of reference, the UE that is recording and uploading the video for distribution via eMBMS may be referred to herein as the "originating UE".

In some embodiments, the video application (1106/1114) of an originating UE may be enhanced to broadcast streaming video from the UE to an access point name (APN) server. A new HTTPS over-the-air (OTA) signaling may be introduced between the host of the broadcast and an internal database access (IDS) server to reserve eMBMS capacity in advance, and on demand. In some embodiments, a new xMB signaling may be introduced between the APN server and BMSC. One or more servers 1104/1112 (e.g., including the APN server, the IDS server, and/or other servers) may be used to assist in or provide the eMBMS service.

In these embodiments, new mechanisms may be needed on the UE side and on the network side to reserve capacity in the network on behalf of the customers. The APN server may start advertising an incoming eMBMS session using existing eMBMS mechanisms. UEs that are authorized for the session may, at the appropriate time (e.g., a time indicated in the advertisement from the APN server) connect to the eMBMS and receive the feed. The APN server may buffer and relay the video broadcast from the originating UE to the desired eMBMS area.

Various business models may be considered for user-initiated eMBMS, according to various embodiments. For example, user-initiated eMBMS may be implemented as a professional service for enterprise, where the eMBMS capacity is acquired by a company and allocated to originating UEs according to their own internal arrangement.

Alternatively, a user-based service may be implemented where the end user receiving the service (i.e., the originating UE) pays for the eMBMS capacity.

To implement user-initiated eMBMS, various types of network side infrastructure and capabilities may be required. For example, the network may be required to support 3GPP eMBMS, including multicast operation on demand (MooD). Additional signaling may be required from the APN/IDS server to BM-SC in order to reserve eMBMS capacity in the desired area following a negotiated request from an originating UE. In some embodiments, an xMB interface may be enhanced with an eMBMS capacity check/reservation from the APN/IDS servers.

Similarly, various types of network side infrastructure and capabilities may be also required on the UE side. For example, the network may be required to support middleware and 3GPP eMBMS, including multicast operation on demand (MooD). Signaling between the UE and Server may be defined for content selection and also for eMBMS capacity check/reservation. An application programming interface (API) may be defined between the middleware and third party applications. In some embodiments, the video application of the originating UE may be extended with broadcasting capability. In some embodiments, additional signaling from the UE to APN/IDS server may be desirable in order to reserve eMBMS capacity in the broadcast area.

Figure 12:
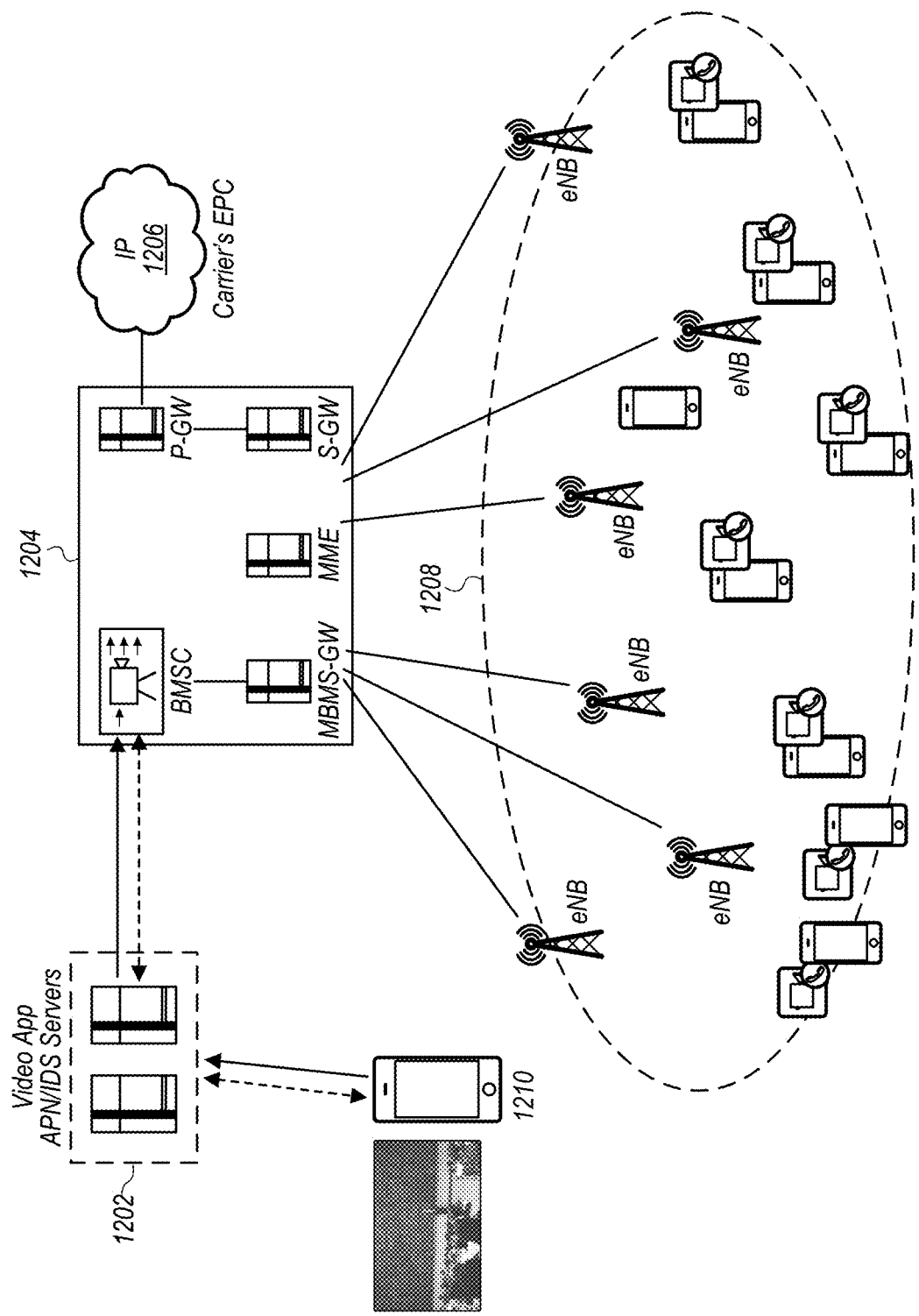
FIG. 12 illustrates a detailed wireless communication system configured to perform user-initiated eMBMS, according to some embodiments.

FIG. 12—Detailed Wireless Communication System for User-Initiated eMBMS

FIG. 12 is a detailed illustration of an exemplary wireless communication system configured to implement user-initiated eMBMS, according to some embodiments.

As illustrated, an originating UE device 1210 (e.g., a UE device used by a professor or speaker that wishes to employ user-initiated eMBMS to broadcast a recorded lecture video) may interface with a video app APN/IDS or HTTP Live Streaming (HLS) server 1202, to provide data package(s) (such as a recorded lecture) for eMBMS. Additionally, the originating UE may negotiate with the video app server 1202 to establish terms, conditions, and/or payment of an upcoming eMBMS session. The video app server may then transmit the data package(s) to the network controller 1204, whereby the network controller may initiate an eMBMS to broadcast the data packages through one or more eNBs to a plurality of UEs comprised within a broadcast service area 1208. The UEs may have a video application installed that is associated with the video app server, which they may use to access the data packages received via eMBMS.

Figure 13A:
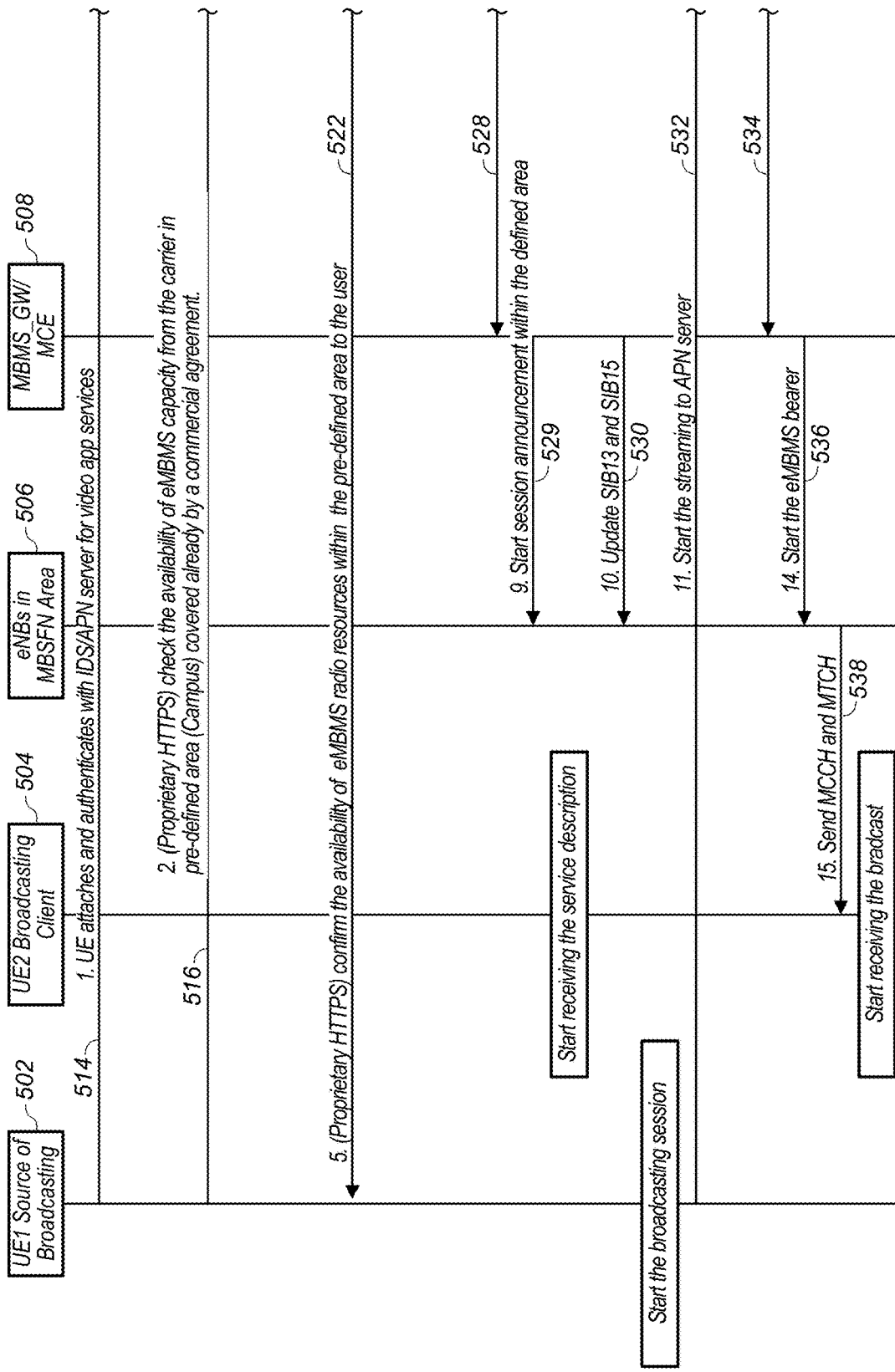
FIGS. 13A-13B are a detailed communication flow diagram illustrating an exemplary method for conducting user-initiated eMBMS, according to some embodiments.
Figure 13B:
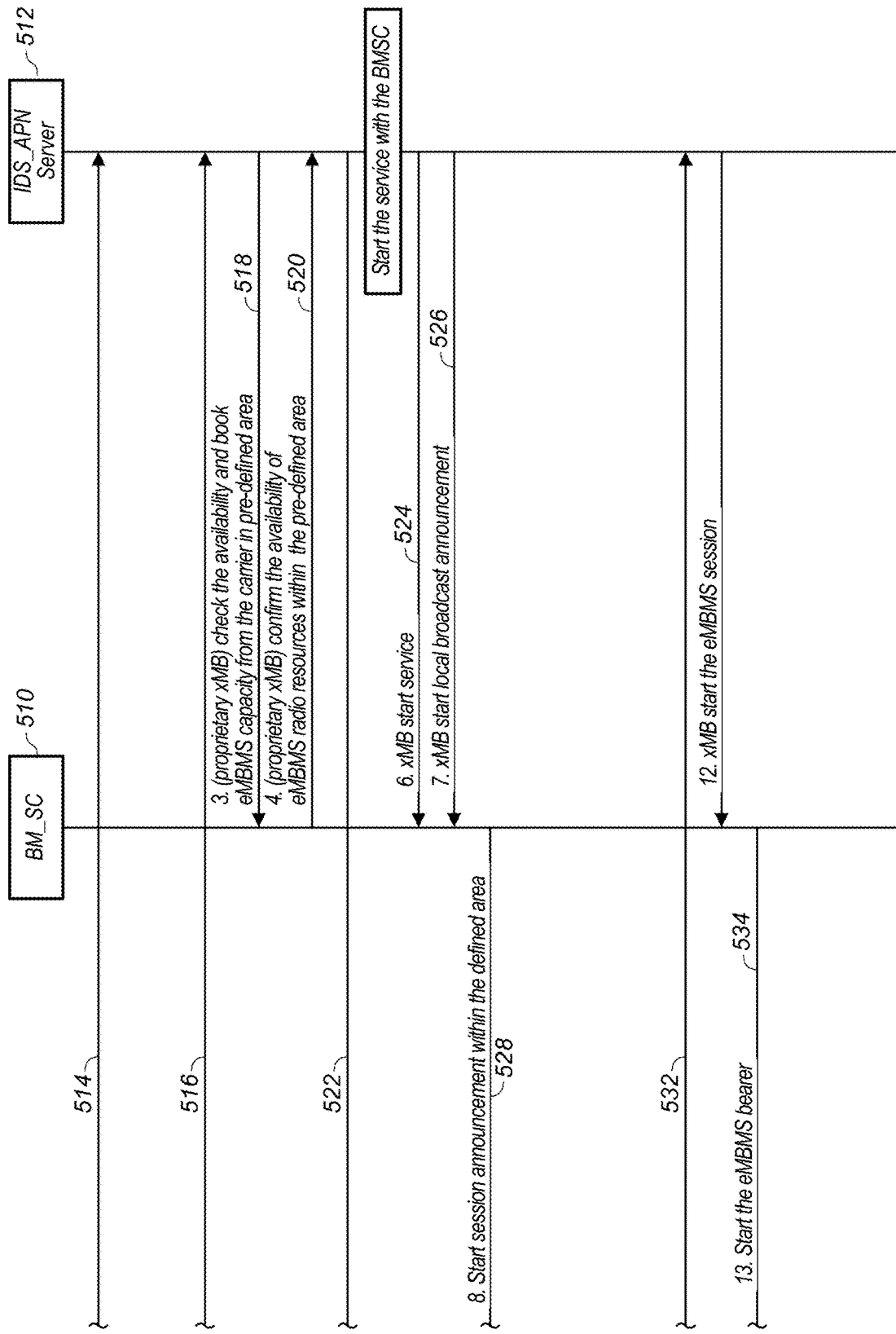

FIGS. 13A-13B—Communication Flow for User-initiated eMBMS

FIGS. 13A-13B are a detailed communication flow diagram illustrating an exemplary method for conducting user-initiated eMBMS, according to some embodiments.

At 514, an originating UE 502 may communicate with the IDS/APN server to attach and authenticate for an upcoming eMBMS session. For example, the user may decide to start on schedule and use an eMBMS session, e.g., within the campus. Accordingly, at 516, the originating UE may further check with the IDS/APN server to determine availability of eMBMS capacity from the carrier in a pre-defined area, such as a college campus or another area.

At 518, the IDS/APN may check with the BMSC to determine availability and book eMBMS capacity from the carrier in a predefined area. At 520, the BMSC may respond to the IDS/APN Server to confirm availability of eMBMS resources. At 522, the IDS/APN server may confirm to the originating UE 502 the availability of eMBMS radio resources within the predefined area.

At 524, the IDS/APN or HLS server may communicate through xMB (or any HTTP-based interface) to the BMSC to start the eMBMS service, and may further communicate at 526 to start a local broadcast announcement. At 528, the BMSC may then start a session announcement within the defined area to the MBMS GW 508. At 529, the MBMS GW 508 may notify the eNBs 506 in the broadcast area (e.g., the multicast broadcast single-frequency network (MBSFN) area) to start the session within the defined area. The MBMS GW may then notify at 530 the eNBs 506 to update SIB 13/SIB 15 protocols.

The originating UE 502 may then send a notification at 532 to the IDS/APN server to start the eMBMS streaming session, whereby the IDS/APN server notifies the BMSC to start the eMBMS session at 534 through the MBMS GW and the eNBs. The eNBs may then broadcast the eMBMS information (data packages) using a multicast control channel and a multicast traffic channel (MCCH/MTCH). The receiving UEs may then start receiving the broadcast data packages.

Intelligent eMBMS for Distributed Learning

Intelligent eMBMS may be employed for distributed learning in a crowd sourced machine learning (ML) model application. The crowd sourced ML model may pertain to a variety of applications, including but not limited to predictive caching, models for liveness detection in face recognition based authentication, keyboard text prediction, self-driving/autonomous service robot software training, wearable/biomedical devices software training/re-training, image classification and sharing models, and language modeling and speech recognition.

Figure 14:
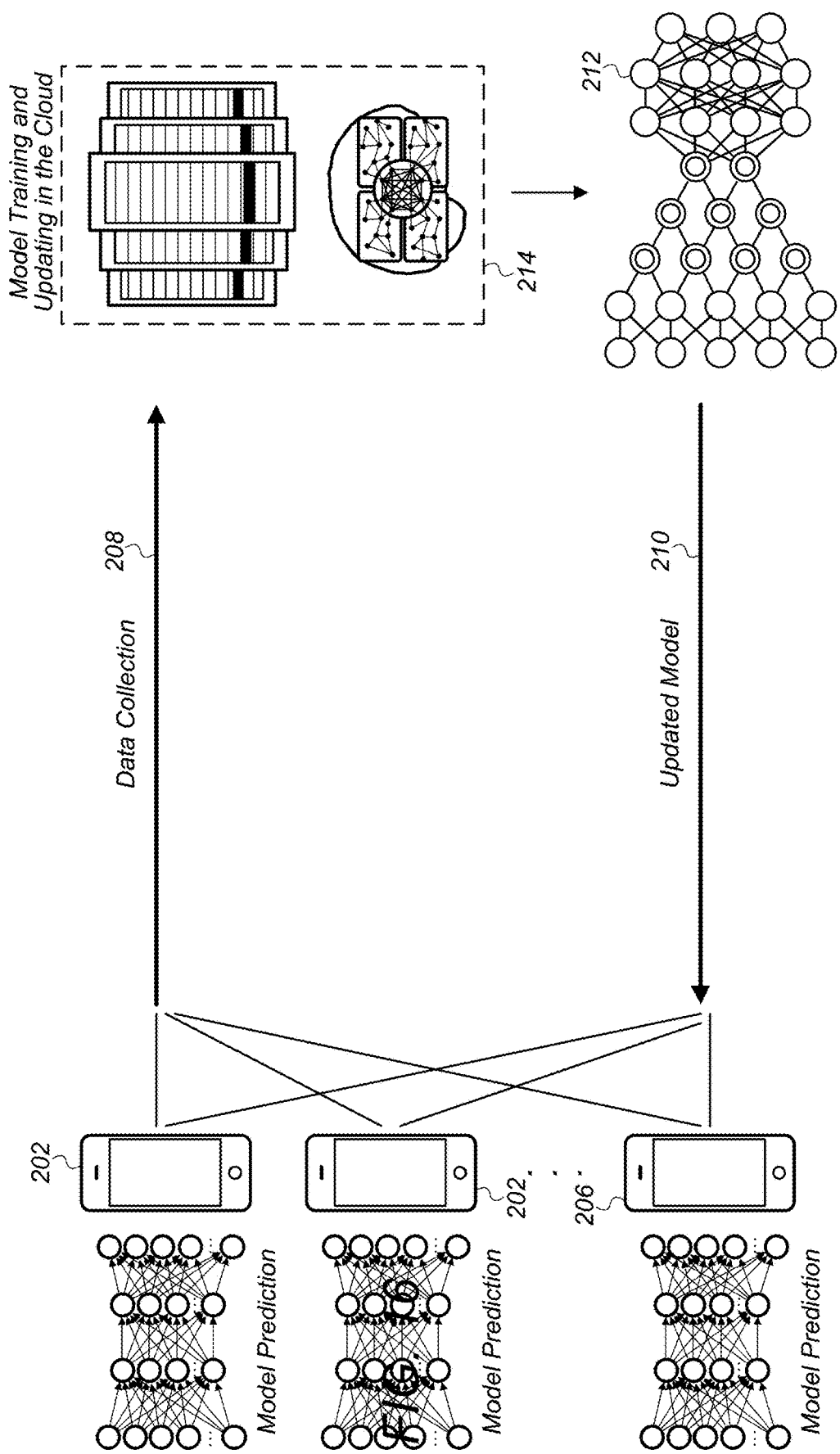
FIG. 14 is a schematic diagram of a traditional method for training a machine learning algorithm to operate on a plurality of UEs, according to the prior art.

FIG. 14—Machine Learning

FIG. 14 illustrates one embodiment of a method for training a machine learning algorithm to operate on a plurality of UEs. As illustrated, traditional machine learning applications may typically collect data from a plurality of participating UEs, and perform model training and updating entirely in the cloud. The cloud may then send the trained and updated model back to the UEs for use in model prediction. This embodiment may present several disadvantages. For example, the machine-learning embodiment of FIG. 14 may introduce privacy issues, as the UEs may be required to transmit potentially personal user data (e.g., text messages, emails, etc) to the cloud for model training and updating. Additionally, the deployment of model updates may be delayed because training and updating may not begin until data collection is complete, and complex training algorithms may incur significant data center resource requirements on the cloud server.

Figure 15:
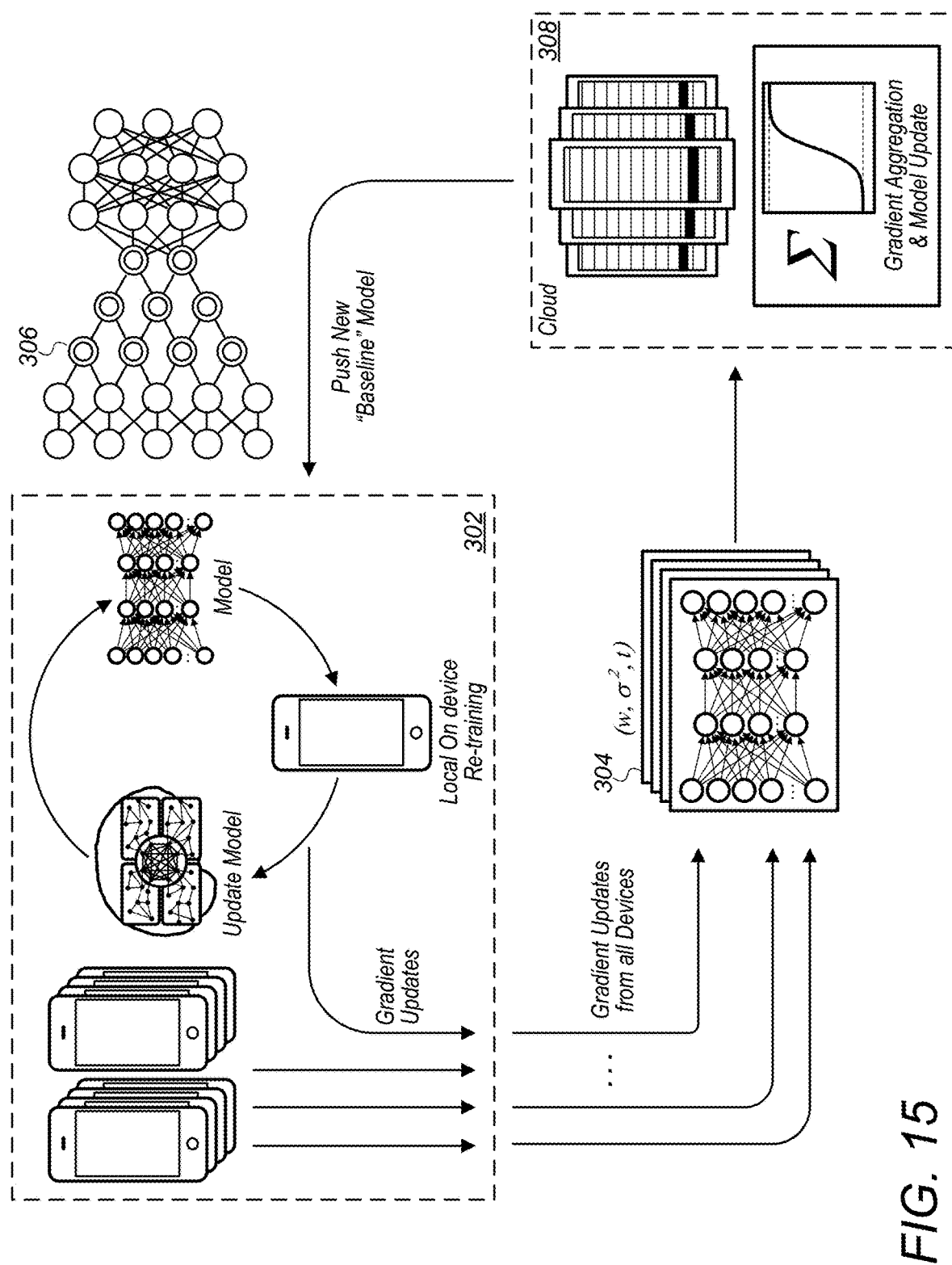
FIG. 15 is a schematic diagram of a method for performing collaborative learning to train a machine learning algorithm to operate on a plurality of UEs, according to the prior art.
Figure 17:
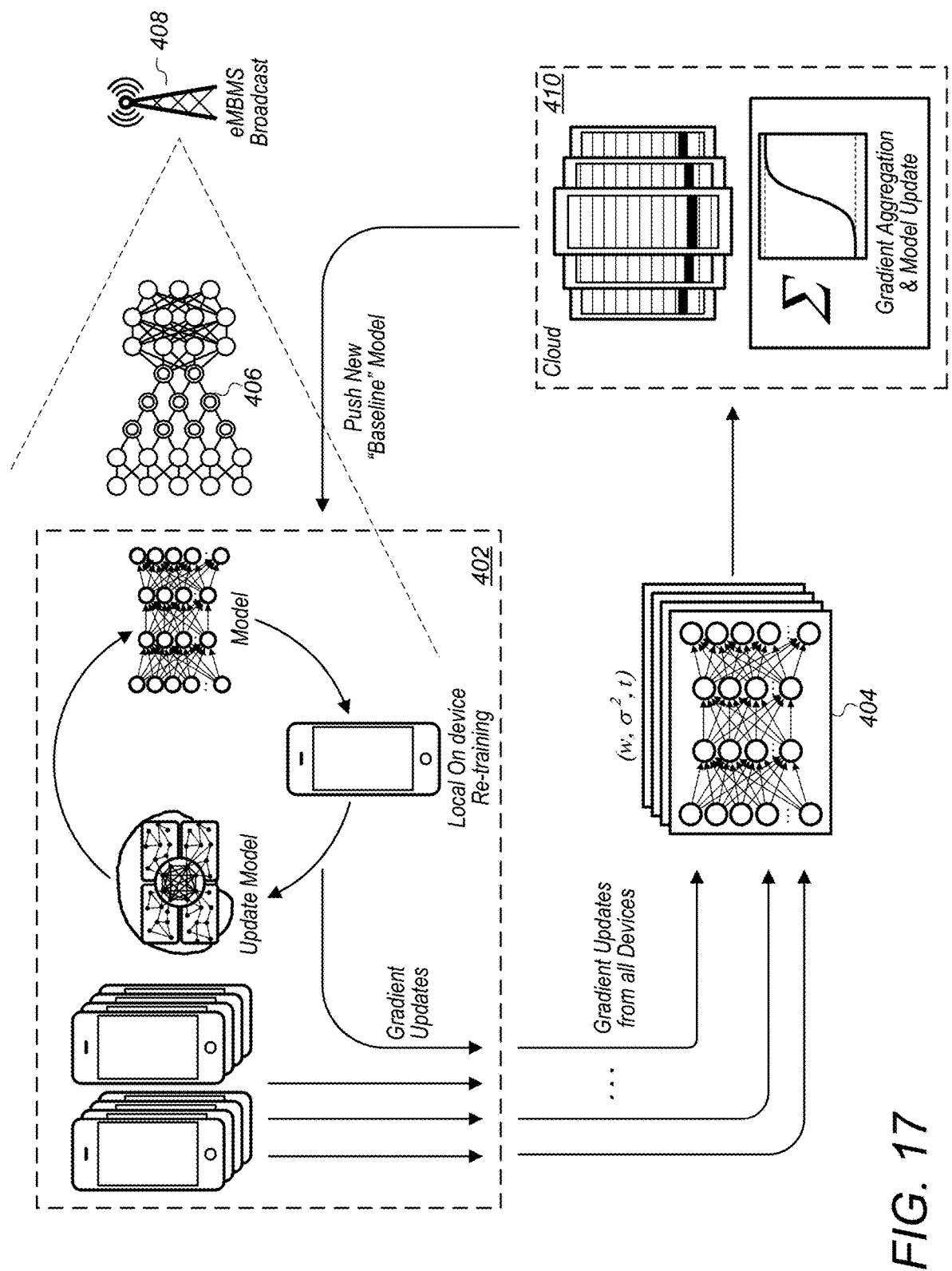
FIG. 17 is a schematic diagram of a method for performing collaborative learning using eMBMS to train a machine learning algorithm to operate on a plurality of UEs, according to some embodiments.

FIG. 15-17—Collaborative Deep Learning

FIG. 15 is a schematic diagram of a method for training a collaborative deep learning algorithm. As illustrated, at step A, a network controller may transmit (e.g., using a push message, or another type of transmission) a baseline machine learning (ML) model to a plurality of UEs. At step B, the UEs may perform local on-device training based on the baseline ML model to obtain updated parameters of the model. The UEs may then upload the updated parameters to the network controller, and at step C the network controller may perform gradient aggregation using all of the received updated parameters to obtain an updated ML model. Performing each of steps A-C may comprise a single round of training, and the method may subsequently repeat by sending the updated ML model back to each of the UEs in a subsequent step A. Collaborative deep learning is explained in further detail in Reference 1, which is cited above and incorporated by reference.

In exemplary embodiments, collaborative deep learning may enable large scale, on-device machine learning in a privacy sensitive manner. Collaborative deep learning may enable distributed and orchestrated on-device training, and may not require personal data to leave the device. In other words, the models may be trained and improved without sending training data from the UEs to the cloud. Collaborative deep learning may lower the latency associated with training and updating the ML model, as the computational load associated with training and updating is distributed among the participating UEs. New (i.e., updated) models may be used immediately and synchronously by the participating UEs, as they may all receive new baseline models from the cloud in a single eMBMS broadcast multicast communication.

FIG. 16 is a table illustrating the computational benefits associated with collaborative deep learning, for a particular implementation on the CIFAR-10 image dataset. As illustrated, the presence of 100 clients (e.g., UEs) allows the total data downloaded to be distributed among the clients in a single broadcast, thus reducing the download throughput requirements by a factor of 100 compared to a unicast methodology. Additionally, FIG. 16 illustrates how the number of rounds of uplink communication is limited to several rounds per user, indicating a minor impact on the bandwidth usage of the user.

The two columns of FIG. 16 compare the computational requirement of achieving 80% accuracy and 85% accuracy. As illustrated, the incremental increase in accuracy (from 80% to 85%) is accompanied by a more than seven-fold increase in the number of rounds of communication required, from 280 to 2000.

In a collaborative training process, a tradeoff exists between rounds of communication and model accuracy. For example, additional rounds of communication between the UEs and the server may produce a better trained model, but may require additional time and consume additional radio resources. In general, each participating UE is typically expected to take part in a couple of rounds of communication per day.

As illustrated in FIG. 17, in some embodiments, the updated ML model may be distributed to the UEs using eMBMS. This may be more efficient, in that the UE simply listens for the eMBMS-distributed model. The user may not have to pay for download, and it may not use data in a user's data plan. When uploading updated parameters associated with the model, a user may participate in a few rounds of uploads per day. Because the user is only uploading particular parameters associated with the model (and not the entire model), the uploading requirements may be affordable. Deep learning may be enabled on user data in a distributed, privacy sensitive fashion.

Figure 18:
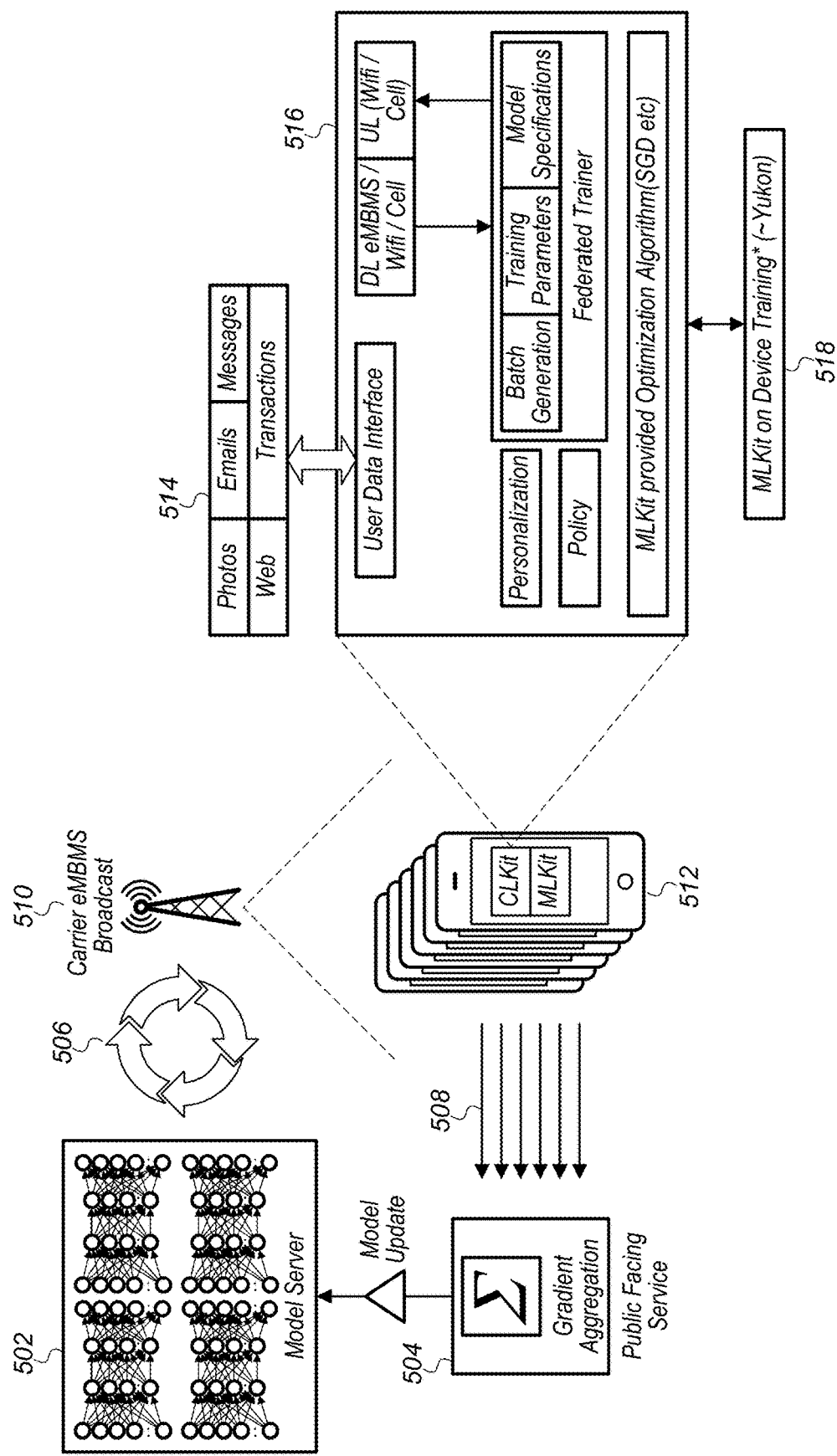
FIG. 18 illustrates in further detail a method for a UE to participate in collaborative learning, according to some embodiments.

FIG. 18—Employing UE for Collaborative Deep Learning

FIG. 18 illustrates in further detail an exemplary method whereby eMBMS may be utilized for a collaborative deep learning service. FIG. 18 shows how a variety of types of user-initiated content such as photos, emails, messages, web traffic, and monetary transactions may be collected by a user data interface, for use in training one or more ML algorithms. Furthermore, the downlink (DL) capacity of the UE, which may receive data through one or more of eMBMS, WiFi, or cellular data, may interface with a Federated Trainer to update training parameters of the ML algorithm. Furthermore, updated model specifications (i.e., updated model parameters) may be interfaced with the upload (UL) capacity of the UE, which may upload the updated parameters to the network controller using WiFi, cellular data, or other methods.

Figure 19:
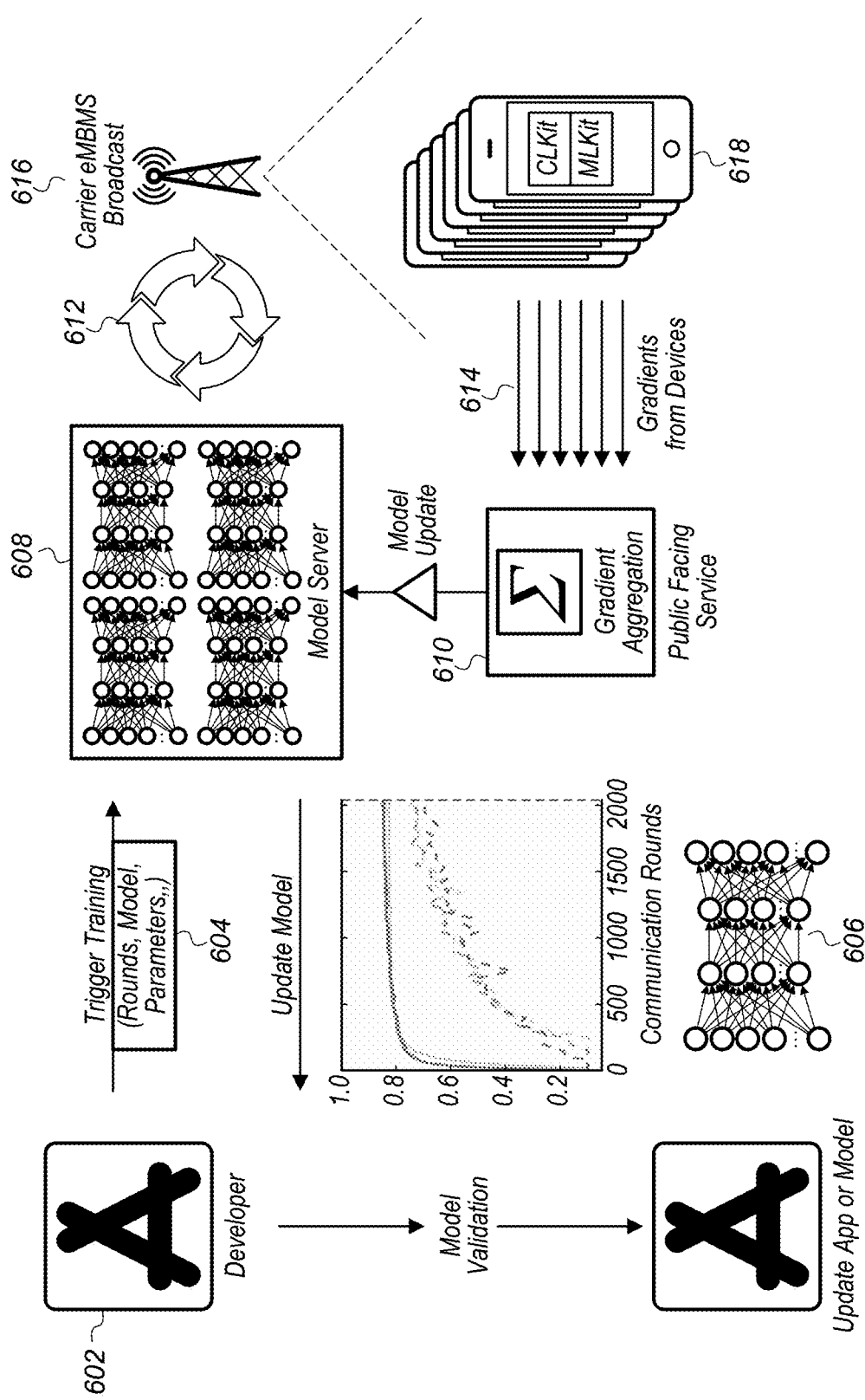
FIG. 19 illustrates additional steps to update a machine learning model by a developer, according to some embodiments.

FIG. 19—Developer Updates for Collaborative Deep Learning

FIG. 19 illustrates additional steps which may be performed during a collaborative learning methodology. As illustrated, subsequent to the initiation of training, collaborative learning training cycle, and updating of the model by the network controller, the network controller may transmit the updated model to a developer for model validation. The developer may then update the app or model for further distribution to clients.

Distributed deep learning may enable new applications for machine learning algorithms. For example, it may enable location-based eMBMS training, which may allow the ML algorithms to offer increased personalization. For example, a separate ML algorithm may be trained and deployed for different geographic regions, offering customized location-based training of the ML algorithm. Distributed deep learning may also enable real-time learning, as it enables updating a new model in a relatively short time (e.g., shorter than legacy deep learning implementations).

In some embodiments, eMBMS may be used to broadcast multicast ML models to enable personalized keyboard prediction using personalized, collaboratively learnt language dialects. In other embodiments, it may be used to enable efficient model transfer during online reinforcement learning for autonomous systems. For example, it may be used to enable large scale human-assisted training. For the case of intelligent cars, models may be applied to help with driver assistance and warning systems. Using eMBMS for transmission in the downlink direction may help scale the model training process for a large fleet of autonomous agents such as smart cars, or another type of intelligent device.

eMBMS for Predictive Caching

Often, a user's behavior in consuming data is predictable to a large degree. For example, a user may implement a typical daily routine, which may typically occur in a particular location or sequence of locations. Users may often access specific websites at specific times of day, for example. Additionally, certain geographically located/correlated users may have overlap in their data consumptions. For example, a certain percentage of residents of a particular metropolitan area may access a particular online news website or application. Alternatively, a large percentage of incoming students at a university for a particular major may watch class videos associated with classes for that major (e.g., 90% of incoming Stanford EE grads may watch EE261 and EE278 class videos). In these examples, eMBMS may be used to deliver common data to users within a particular group. In these embodiments, it may be advantageous to employ pre-cashing of data that is anticipated to be accessed by many UE devices, to increase overall system throughput and reduce latency in data consumption for each user.

In predictive cashing, a data consumption behavior vector a may be learnt on the device for each user. The data consumption behavior vector may specify which data is used at which time of day and at which location, etc. The behavior vector may be generated across multiple devices (i.e. iPhone, MAC, or iPad) for a particular user or user account. Because the user may not exclusively use cellular communications (e.g., the user may occasionally access information from a WiFi or other connection), the network may know only part of the information associated with the data consumption behavior vector. in other words, the network may infer this information from cellular traffic but may not be able to infer the information when the user is using WiFi to consume data. For at least this reason, it may be advantageous for the data consumption behavior to be learned on the device. In these embodiments, each user may share its learnt data consumption behavior vector with the network. The network may construct a super/aggregate data consumption behavior vector based at least in part on all of the received behavior vectors from participating UEs. The network may then send the common/aggregate data/content over eMBMS, whereby each user may receive its part of the data from the eMBMS broadcast. The participating UEs may then use received the data/content from the eMBMS broadcast for predictive cashing.

Privacy in Collaborative Training: Secure Aggregation Protocol

Various embodiments described herein may be used in conjunction with various security protocols, such as the secure aggregation protocol discussed in Reference 2, which is cited above and incorporated by reference. In this protocol, the server may not know which user sent a specific gradient update, but may only know in aggregate. The Secure Aggregation Protocol may operate according to one or more of the following principals: it may assume pairwise channels between users; pairs of users may compute a mutually zeroing noise vector and add the vector to their gradient updates; the server may receive a full update only after aggregating all gradients (such that noise cancels out); and/or the protocol may allow for users dropping out.

Other Information and Additional Embodiments

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The following numbered paragraphs describe additional embodiments.

In some embodiments, a network controller is configured to direct broadcast and/or multicast communication. The network controller may comprise a processing element communicatively coupled to network infrastructure.

The processing element may be configured to receive updated parameters associated with one or more machine learning models from a plurality of user equipment devices (UEs), receive location information from at least a subset of the plurality of UEs, perform gradient aggregation using the updated parameters and update the one or more machine learning models based on the gradient aggregation, select one or more broadcast regions within which to perform broadcast and/or multicast services based at least in part on the location information, select one or more of the updated machine learning models to broadcast and/or multicast in the one or more selected broadcast regions based on the updated parameters and the location information, and provide an indication to a remote device to broadcast and/or multicast the selected one or more updated machine learning models in the one or more broadcast regions.

In some embodiments, the processing element and the radio are further configured to receive a level of movement from one or more of the plurality of UE, wherein, in said selecting one or more broadcast regions and one or more updated machine learning models, updated parameters and location information associated with a UE with a higher level of movement is given a weaker consideration than updated parameters and location information associated with a UE with a lower level of movement.

In some embodiments, the processing element is further configured to, for each of a plurality of broadcast regions, determine a number of UEs located in the respective broadcast region from which updated parameters were received for a common machine learning model; and select the respective broadcast region for performing broadcast and/or multicast services if the number of UEs located in the broadcast region from which updated parameters were received for a common machine learning model is greater than a predetermined threshold.

In some embodiments, a user equipment device (UE) is configured to perform broadcast and/or multicast communication. The UE device may comprise a radio, comprising an antenna configured for wireless communication; and a processing element operably coupled to the radio.

The processing element and the radio may be configured to perform local training of a machine learning model to obtain updated parameters of the machine learning model; transmit the updated parameters to a remote server; and at least in part in response to transmitting the updated parameters to the remote server, receive an updated machine learning model from the remote server through broadcast and/or multicast.

In some embodiments, the processing element and the radio are further configured to determine a location of the UE, and transmit the location of the UE concurrently with the transmission of updated parameters, wherein receiving the updated machine learning model through broadcast and/or multicast is further in response to transmitting the location of the UE.

In some embodiments, the processing element and the radio are further configured to determine a degree of movement of the UE and transmit the degree of movement of the UE concurrently with the transmission of user preference, wherein receiving at least one of the one or more data packages through broadcast and/or multicast is further in response to transmitting the degree of movement of the UE.

In some embodiments, the processing element and the radio are further configured to determine a remaining battery level of the UE and not transmit the updated parameters to the remote server, and not participate in broadcast and/or multicast services, if the battery level of the UE is below a predetermined threshold.

In some embodiments, the processing element and the radio are further configured to determine that the UE has entered a location where broadcast and/or multicast services are available, wherein said transmitting the updated parameters to the remote server is performed at least in part based on a determination that the UE has entered a location where broadcast and/or multicast services are available.

In some embodiments, the broadcast and/or multicast services comprise enhanced multimedia broadcast multicast services (eMBMS).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A network controller configured to direct broadcast communication, comprising:
    a processing element communicatively coupled to network infrastructure, wherein the processing element is configured to:
        receive user preference information from a plurality of user equipment devices (UEs), the user preference information indicating a preference of respective UEs to receive one or more data packages through a broadcast service;
        receive location information from at least a subset of the plurality of UEs;
        receive a level of movement from one or more of the plurality of UEs;
        select one or more broadcast regions within which to perform broadcast services based at least in part on the user preference information and the location information;
        for each selected broadcast region, select one or more data packages to broadcast based at least in part on the user preference information and the location information, wherein, in said selecting one or more broadcast regions and one or more data packages, user preference information and location information associated with a UE with a higher level of movement is given a weaker consideration than user preference information and location information associated with a UE with a lower level of movement; and
        provide an indication to a remote device to broadcast the one or more data packages in the respective one or more broadcast regions.

2. The network controller of claim 1,
    wherein the one or more data packages comprise parameters associated with a collaborative deep learning model.

3. The network controller of claim 1,
    wherein the user preference information comprises a data consumption behavior vector, and wherein selecting one or more data packages to broadcast based at least in part on the user preference information comprises constructing an aggregate data consumption behavior vector based on the data consumption vectors received from the plurality of UEs.

4. The network controller of claim 1, wherein the processing element is further configured to:
    for each of a plurality of broadcast regions, determine a number of UEs located in the respective broadcast region that are associated with user preference information indicating a preference for receiving a common data package; and
    select the respective broadcast region for performing broadcast services if the number of UEs located in the broadcast region that are associated with user preference information indicating a preference for receiving a common data package is greater than a predetermined threshold.

5. The network controller of claim 1,
    wherein the one or more data packages are selected from a set of potential data packages available for broadcast received from one or more remote devices; and
    wherein said selecting one or more broadcast regions and one or more data packages is further based at least in part on a negotiation process between the network controller and the one or more remote devices.

6. The network controller of claim 1, wherein the data packages comprise one or more of:
    an operating system update;
    an application update;
    a local update to a map application;
    an audio file; and
    a video file.

7. The network controller of claim 1, wherein the broadcast services comprise enhanced multimedia broadcast multicast services (eMBMS).

8. The network controller of claim 1, wherein the network controller is a content provider server.

9. A user equipment device (UE) configured to perform broadcast communication, comprising:
    a radio, comprising an antenna configured for wireless communication;
    a processing element operably coupled to the radio;
    wherein the processing element and the radio are configured to:
        receive, from a remote server, a list of data packages that are available for broadcast services;
        receive an input specifying user preference for receiving one or more of the data packages through broadcast;
        determine a degree of movement of the UE;
        concurrently transmit the user preference and the degree of movement of the UE to the remote server; and
        at least in part in response to transmitting the user preference and the degree of movement of the UE to the remote server, receive at least one of the one or more data packages through broadcast.

10. The UE of claim 9,
    wherein the one or more data packages comprise parameters associated with a collaborative deep learning model.

11. The UE of claim 9, wherein the processing element and the radio are further configured to:
    use artificial intelligence and machine learning mechanisms in an operating system of the UE to determine the user preference information.

12. The UE of claim 9, wherein the processing element and the radio are further configured to:
    determine a location of the UE;
    transmit the location of the UE concurrently with the transmission of user preference, wherein receiving at least one of the one or more data packages through broadcast is further in response to transmitting the location of the UE.

13. The UE of claim 9, wherein the processing element and the radio are further configured to:
   determine a remaining battery level of the UE; and
   not transmit the user preference to the remote server, and not participate in broadcast services, if the battery level of the UE is below a predetermined threshold.

14. The UE of claim 9, wherein the processing element and the radio are further configured to:
   determine that the UE has entered a location where broadcast services are available;
   wherein said transmitting the user preference to the remote server is performed at least in part based on a determination that the UE has entered a location where broadcast services are available.

15. The UE of claim 9, wherein the data packages comprise one or more of:
   an operating system update;
   an application update;
   a local update to a map application;
   an audio file; and
   a video file.

16. The UE of claim 9, wherein the broadcast services comprise enhanced multimedia broadcast multicast services (eMBMS).

17. A method for directing broadcast communication, the method comprising, by a network controller:
   receiving user preference information from a plurality of user equipment devices (UEs), the user preference information indicating a preference of respective UEs to receive one or more data packages through a broadcast service;
   receiving location information from at least a subset of the plurality of UEs;
   receive a level of movement from one or more of the plurality of UEs;
   selecting one or more broadcast regions within which to perform broadcast services based at least in part on the user preference information and the location information;
   for each selected broadcast region, selecting one or more data packages to broadcast based at least in part on the user preference information and the location information, wherein, in said selecting one or more broadcast regions and one or more data packages, user preference information and location information associated with a UE with a higher level of movement is given a weaker consideration than user preference information and location information associated with a UE with a lower level of movement; and
   providing an indication to a remote device to broadcast the one or more data packages in the respective one or more broadcast regions.

18. The method of claim 17, the method further comprising, by the network controller:
   for each of a plurality of broadcast regions, determining a number of UEs located in the respective broadcast region that are associated with user preference information indicating a preference for receiving a common data package; and
   selecting the respective broadcast region for performing broadcast services if the number of UEs located in the broadcast region that are associated with user preference information indicating a preference for receiving a common data package is greater than a predetermined threshold.

19. The method of claim 17, wherein the user preference information comprises a data consumption behavior vector, and wherein selecting one or more data packages to broadcast based at least in part on the user preference information comprises constructing an aggregate data consumption behavior vector based on the data consumption vectors received from the plurality of UEs.

20. The method of claim 17, wherein the broadcast services comprise enhanced multimedia broadcast multicast services (eMBMS).

* * * * *